United States Patent
Park et al.

(10) Patent No.: US 11,194,510 B2
(45) Date of Patent: Dec. 7, 2021

(54) STORAGE DEVICE AND METHOD OF OPERATING THE SAME

(71) Applicant: SAMSUNG ELECTRONICS CO., LTD., Suwon-si (KR)

(72) Inventors: Hyun-chul Park, Suwon-si (KR); Young-pil Song, Hwaseong-si (KR); Sang-won Jung, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 16/138,272

(22) Filed: Sep. 21, 2018

(65) Prior Publication Data

US 2019/0095137 A1 Mar. 28, 2019

(30) Foreign Application Priority Data

Sep. 22, 2017 (KR) .................. 10-2017-0122665

(51) Int. Cl.
*G06F 12/00* (2006.01)
*G06F 13/00* (2006.01)
*G06F 3/06* (2006.01)

(52) U.S. Cl.
CPC .......... *G06F 3/0659* (2013.01); *G06F 3/0613* (2013.01); *G06F 3/0656* (2013.01); *G06F 3/0679* (2013.01)

(58) Field of Classification Search
CPC .... G06F 3/0659; G06F 3/0613; G06F 3/0656; G06F 3/0679
USPC ........................................................ 711/103
See application file for complete search history.

(56) References Cited

U.S. PATENT DOCUMENTS

| | | | | |
|---|---|---|---|---|
| 5,274,772 A | * | 12/1993 | Dunn | G06F 3/0601 360/48 |
| 5,301,278 A | * | 4/1994 | Bowater | G06F 13/1689 365/230.03 |
| 5,845,271 A | * | 12/1998 | Thaler | G06N 3/105 706/16 |
| 8,411,496 B2 | | 4/2013 | Hong | |
| 8,468,318 B2 | | 6/2013 | Colgrove et al. | |
| 8,938,581 B2 | | 1/2015 | Cho et al. | |
| 9,122,401 B2 | | 9/2015 | Zaltsman et al. | |
| 9,563,368 B2 | | 2/2017 | Shin et al. | |
| 9,619,175 B2 | * | 4/2017 | Chung | G06F 12/0246 |
| 9,640,264 B2 | * | 5/2017 | Kim | G11C 11/5628 |
| 2002/0059508 A1 | * | 5/2002 | Lentz | G06F 12/0813 712/15 |

(Continued)

FOREIGN PATENT DOCUMENTS

| KR | 10-1363422 | 2/2014 |
|---|---|---|
| KR | 10-2014-0035776 | 3/2014 |

*Primary Examiner* — Sheng Jen Tsai
(74) *Attorney, Agent, or Firm* — F. Chau & Associates, LLC

(57) ABSTRACT

A storage device and a method of operating a storage device including a non-volatile memory. The method includes selecting a first task from among a plurality of tasks queued in a task queue of the storage device; determining whether a mode of the first task is identical to a mode of a previously-executed task; and determining an execution order of the first task according to a result of determination. The modes and the region addresses of tasks may be utilized to group tasks to permit interleaving of programming data.

20 Claims, 17 Drawing Sheets

(56) References Cited

U.S. PATENT DOCUMENTS

| | | | |
|---|---|---|---|
| 2003/0088751 A1* | 5/2003 | Wu | G06F 13/1631 |
| | | | 711/167 |
| 2004/0066700 A1* | 4/2004 | Lee | G11C 7/1021 |
| | | | 365/232 |
| 2010/0052862 A1* | 3/2010 | Hsieh | G06K 7/0008 |
| | | | 340/10.2 |
| 2011/0164452 A1* | 7/2011 | Parker | G11C 7/22 |
| | | | 365/185.18 |
| 2011/0173619 A1* | 7/2011 | Fish | G06F 16/2365 |
| | | | 718/101 |
| 2011/0238933 A1* | 9/2011 | Fujimoto | G06F 12/0246 |
| | | | 711/154 |
| 2012/0137093 A1* | 5/2012 | Ferrario | G06F 11/1441 |
| | | | 711/162 |
| 2012/0254524 A1 | 10/2012 | Fujimoto | |
| 2013/0185525 A1* | 7/2013 | Lee | G06F 12/00 |
| | | | 711/151 |
| 2013/0305259 A1* | 11/2013 | Wang | G06F 9/526 |
| | | | 718/106 |
| 2014/0281170 A1* | 9/2014 | Cho | G06F 3/0617 |
| | | | 711/103 |
| 2014/0369124 A1* | 12/2014 | Moon | G11C 16/16 |
| | | | 365/185.11 |
| 2016/0117102 A1 | 4/2016 | Hong et al. | |
| 2017/0083264 A1* | 3/2017 | Lee | G06F 12/08 |
| 2018/0018610 A1* | 1/2018 | Del Balso | G06N 3/08 |
| 2019/0095117 A1* | 3/2019 | Park | G06F 3/0634 |

\* cited by examiner

| Status | Not Ready | Not Ready | Not Ready | ... | Not Ready | Not Ready | Ready | Ready |
|---|---|---|---|---|---|---|---|---|
| Task No. | N | N-1 | N-2 | ... | 4 | 3 | 2 | 1 |

STORAGE DEVICE AND METHOD OF OPERATING THE SAME

CROSS-REFERENCE TO RELATED APPLICATION

This application claims the benefit of Korean Patent Application No. 10-2017-0122665, filed on Sep. 22, 2017, in the Korean Intellectual Property Office, the disclosure of which is incorporated by reference herein.

TECHNICAL FIELD

The inventive concept relates to a storage device, and more particularly, to a storage device supporting a task queue function and a method of operating the storage device.

DESCRIPTION OF THE RELATED ART

Flash memory is a non-volatile memory that can maintain stored data even though power being supplied thereto is cut off. Recently, storage devices including embedded multi-media cards (eMMCs), universal flash storages (UFSs), solid state drives (SSDs), and memory cards, have come into widespread use. Such storage devices are used to store or transport a large quantity of data for access by another device.

SUMMARY

The inventive concept provides a storage device having a more reliable write function and a method of operating the storage device.

According to an embodiment of the inventive concept, there is provided a method of operating a storage device including a non-volatile memory, the method including: selecting a first task from among a plurality of tasks queued in a task queue of the storage device; determining whether a mode of the first task is identical to a mode of a previously-executed task; and determining an execution order of the first task according to a result of the determination.

According to an embodiment of the inventive concept, there is provided a method of operating a storage device including a non-volatile memory, the method including: selecting a first task from among a plurality of tasks queued in a task queue of the storage device; comparing a first command argument corresponding to the first task with a second command argument corresponding to a previously-executed task; and determining an execution order of the first task according to a result of the comparison.

According to an embodiment of the inventive concept, there is provided an embedded multi-media card (eMMC) including: a task queue in which a plurality of tasks are queued; and a scheduler configured to determine an execution order of the plurality of tasks based on a mode set in each of the plurality of tasks queued in the task queue so that tasks set in a same mode from among the plurality of tasks can be continuously executed.

According to an embodiment of the inventive concept, a method of operating a storage device including a non-volatile memory includes selecting, by a scheduler, a first task from among a plurality of tasks queued in a task queue; determining whether a mode of the selected first task is identical to a mode of the last executed task; transmitting an execution order to a host when the mode of the first task is identical to the mode of the last executed task: delaying the transmitting of the execution order to the host when the mode of the first task is not identical to the mode of the last executed task, and selecting a next task from among the plurality of tasks queued in the task queue; and transmitting an execution order for the selected next task to the host in response to determining a mode of the selected next task is identical to the mode of the last executed task.

The delaying of transmitting of the execution order of the first task to the host may occur for a predetermined count of selected tasks when the mode of the first task is not identical to the mode of the last executed task.

The delaying of transmitting of the execution order of the first task to the host may occur for a predetermined period of time.

The execution order of the first task may be transmitted to the host after the predetermined count has been reached.

BRIEF DESCRIPTION OF THE DRAWINGS

Embodiments of the inventive concept will be more clearly understood from the following detailed description taken in conjunction with the accompanying drawings in which:

FIGS. 14A and 14B are comparative examples for operations of a storage device according to an embodiment of the inventive concept in which FIG. 14a shows the data is programmed into a non-volatile memory, and FIG. 14B shows the data is not programmed into the non-volatile memory;

DETAILED DESCRIPTION OF THE EMBODIMENTS

Hereinafter, embodiments of the inventive concept will be described in detail with reference to the attached drawings.

Figure 1:
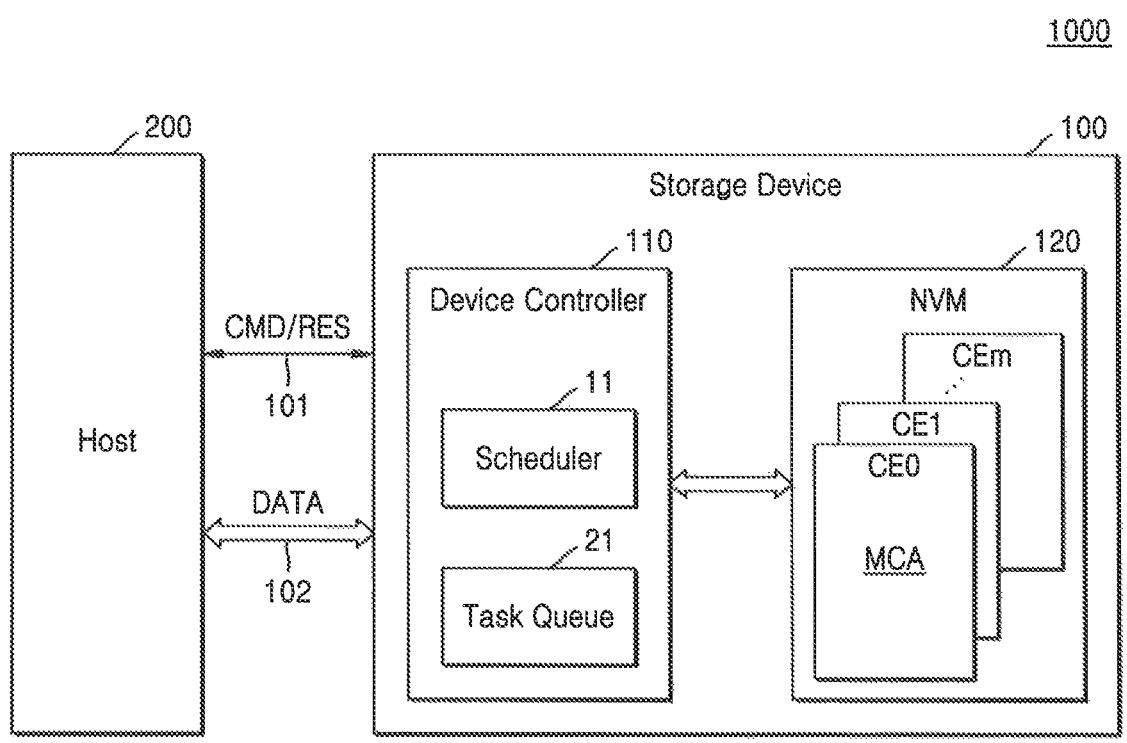
FIG. 1 is a block diagram of a storage system according to an embodiment of the inventive concept.

FIG. 1 is a block diagram of a storage system according to an embodiment of the inventive concept.

Referring to FIG. 1, a storage system 1000 may include a storage device 100 and a host 200.

The host 200 may refer to a data processing device that may process data, such as a central processing unit (CPU), a processor, a microprocessor, or an application processor (AP), and may be embedded in or implemented with an electronic apparatus. The electronic apparatus may be implemented with, for example, a personal computer (PC), a data server, a network-attached storage (NAS), an Internet of Things (IoT) apparatus, or a portable electronic device. The portable electronic device may be a lap-top computer, a mobile phone, a smartphone, a tablet PC, a personal digital assistant (PDA), an enterprise digital assistance (EDA), a digital still camera, a digital video camera, an audio apparatus, a portable multimedia player (PMP), a personal navigation device (PND), an MP3 player, a handheld game console, an e-book, or a wearable device.

The host 200 may communicate with the storage device 100 via various interfaces and may control a data processing operation, for example, a data read operation or a data write operation of the storage device 100.

A plurality of commands CMD may be transmitted to the storage device 100 from the host 200 via a command channel 101, and a response RES to the plurality of commands CMD may be transmitted to the host 200 from the storage device 100. There are a plurality of data channels 102, through which the data for a write operation may be transmitted to the storage device 1.00 from the host 200, and the data for a read operation may be transmitted to the host 200 from the storage device 100.

The storage device 100 may include a device controller 110 and a non-volatile memory 120. In some embodiments of the inventive concept, the storage device 100 may be an internal memory embedded in an electronic apparatus. For example, the storage device 100 may be an embedded multimedia card (eMMC), a solid state drive (SSD), or an embedded universal flash storage (UFS) memory device. In some embodiments of the inventive concept, the storage device 100 may be an external memory that may be attached/detached to/from the electronic apparatus. For example, the storage device 100 may be an UFS memory card, a compact flash (CF), a secure digital (SD), a micro secure digital (micro-SD), a mini secure digital (mini-SD), an extreme digital (xD), or a memory stick. Hereinafter, in the present disclosure, it is assumed that the storage device 100 is an eMMC.

The device controller 110 controls data communication between the host 200 and the non-volatile memory 120. For an asynchronous input/output operation of the storage device 100, the device controller 110 may support a cache function and a command queue function (or command queue protocol). A cache-on mode, in which the cache function of the storage device 100 is enabled based on a cache-on command provided from the host 200, may be set, and a cache-off mode, in which the cache function of the storage device 100 is disabled based on a cache-off command, may be set. In an embodiment of the inventive concept, the cache-off mode may be set as a default.

The device controller 110 may include a scheduler 11 and a task queue 21 (or a command queue). The device controller 110 may further include data buffer. The device controller 110 may receive the plurality of commands CMD from the host 200 via a command channel 101 sequentially, and tasks according to the plurality of received commands CMD may be queued in the task queue 21. Thus, the storage device 100 may perform an asynchronous input/output operation of receiving new commands CMD while executing tasks according to the previously-received commands CMD. Thus, increased operating speeds of the storage device 100 may be realized. The storage device 100 may be referred to as a queuing device. Embodiments of the inventive concept that will be described subsequently may be applied to storage devices for supporting a task queue function (or referred to as a command queue function or a multi-queue function), e.g., queuing devices.

The scheduler 11 may determine an execution order of a plurality of tasks queued in the task queue 21. In more detail, the scheduler 11 may determine an execution order of the plurality of tasks based on a command argument of the commands CMD corresponding to the plurality of tasks.

In an embodiment of the inventive concept, the scheduler 11 may check modes of tasks from the command argument of the task and may determine the execution order of the plurality of tasks so that tasks in the same mode may be consecutively executed. The scheduler 11 may check the mode of the corresponding task based on mode information included in the command argument, for example, reliable write, forced write, forced unit access, a data tag mode, and the like. Accordingly, the tasks in the same mode may be consecutively executed even though the consecutive execution of the same mode tasks may not be the order queued in the task queue.

The scheduler 11 may perform an out-of-order scheduling operation. Although there is an order of tasks queued in the task queue 21, according to this embodiment of the inventive concept, the scheduler 11 may not perform the tasks as queued. Thus, the plurality of tasks may be performed not in an order queued in the task queue 21 but in an order determined by the scheduler 11.

In an embodiment of the inventive concept, the scheduler 11 may perform tasks in subsequently different modes when data in a program unit are stored in a data buffer while executing the tasks in the same mode.

In an embodiment of the inventive concept, when the storage device 100 operates in the cache-on mode, the scheduler 11 may determine a write mode of tasks in which a regular write is set in a command argument as a first mode, (for example, a performance write mode) and may determine a write mode of tasks in which at least one of a reliable write, a forced write and a forced unit access (or a write argument that ensure data is programmed to the nonvolatile memory device 120) is set in a command argument, as a second mode (for example, a reliable write mode). When the storage device 100 operates in a cache-on mode, the data buffer included in the device controller 110 may be operated as a cache memory.

When the task in the first mode is executed, data associated with the task in the first mode may be temporarily stored in the data buffer. As a plurality of tasks in the first mode are executed, when data in a program unit are stored in the data buffer, for example, when the data buffer is full, data in a program unit may be flushed from the data buffer and programmed to the nonvolatile memory device 120. However, when the task in the second mode is executed, data according to the task in the second mode may be directly programmed to the nonvolatile memory device 120. The scheduler 11 may determine an execution order of the plurality of tasks so that tasks in the first mode may be executed prior to the tasks in the second mode. Data of the tasks in the first mode may be stored in the data buffer, and when the data in the program unit are stored in the data buffer, subsequently, the scheduler 11 may execute the tasks in the second mode.

In an embodiment of the inventive concept, the scheduler 11 may check an address to be accessed by the tasks from the command argument of the tasks and may determine an execution order of the plurality of tasks so that the tasks to have access to the same address region may be consecutively executed.

With continued reference to FIG. 1, the non-volatile memory 120 may include a plurality of memory devices CE0 to CEm, which may be, for example, memory chips. The plurality of memory devices CE0 to CEm may configure different channels or paths. Each of the plurality of memory devices CE0 to CEm may include a respective memory cell array MCA. In an embodiment of the inventive concept, the memory cell array MCA may include a plurality of flash memory cells, and the plurality of flash memory cells may be NAND flash memory cells, for example. However, embodiments of the inventive concept are not limited to flash memory cells, and the memory cells may be resistive memory cells, such as resistive RAM (ReRAM), phase change RAM (PRAM), or magnetic RAM (MRAM).

In an embodiment of the inventive concept, the memory cell array MCA may be a three-dimensional (3D) memory array. The 3D memory array, which relates to active regions on a silicon substrate and operations of memory cells, is formed in a monolithic manner. For example, at least one physical level of the memory cell arrays having a circuit formed on the substrate or within the substrate. The term "monolithic" means that layers at each level configuring the 3D memory array are stacked directly on layers at each lower level of the 3D memory array. In an embodiment of the inventive concept, the 3D memory array may include vertical NAND strings disposed in a vertical direction so that at least one memory cell may be disposed on another memory cell. The at least one memory cell may include a charge trapping layer.

U.S. Pat. Nos. 7,679,133, 8,553,466, 8,654,587, and 8,559,235, and U.S. Patent Application Publication No. 2011/0233648 disclose adequate configurations to a 3D memory array having a plurality of levels and wordlines and/or bitlines being shared between the plurality of levels and are incorporated by reference as non-essential background material.

Figure 2:
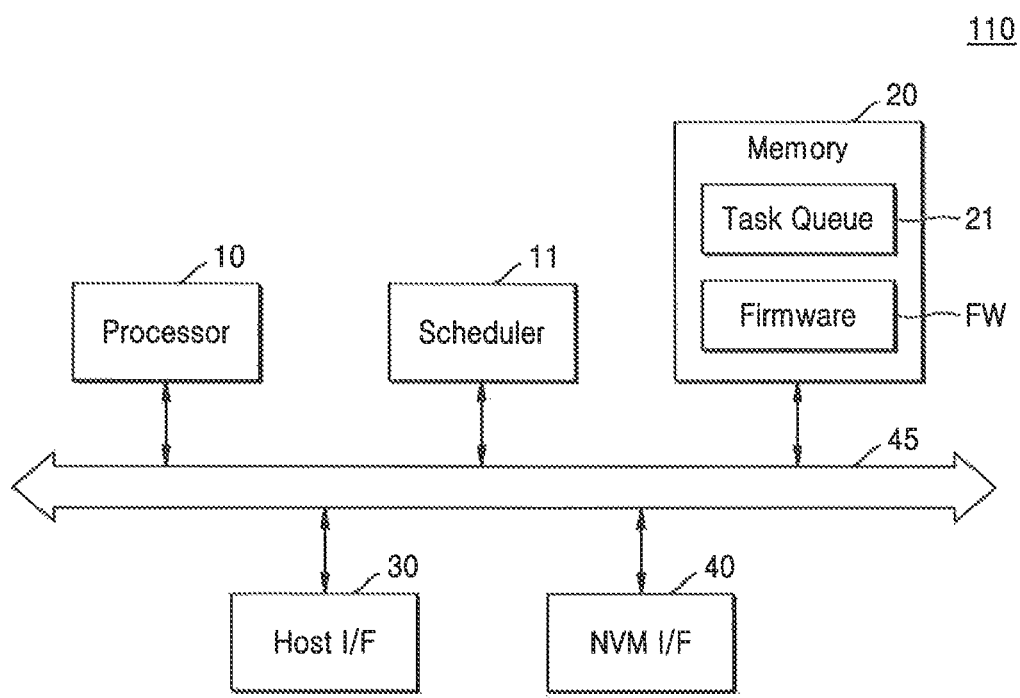
FIG. 2 is a detailed block diagram of a device controller included in a storage device of FIG. 1.

FIG. 2 is a detailed block diagram of the device controller 110 included in the storage device 100 of FIG. 1. A person of ordinary skill in the art should understand and appreciate that the configuration of FIG. 2 is provided for illustrated purposes and embodiments of the inventive concept are not limited to the device controller 110 shown.

Referring to FIG. 2, the device controller 110 may include a processor 10, a scheduler 11, a memory 20, a host interface 30, and a non-volatile memory interface 40. These elements may communicate with one another via a bus 45.

The processor 10 may include a central processing unit (CPU) or a microprocessor and may control overall operations of the device controller 110.

The scheduler 11 may be implemented with hardware, software, firmware, or a combination thereof. When the scheduler 11 is implemented with the software or firmware, the scheduler 11 may be loaded into the memory 20 and may operate according to control of the processor 10.

The memory 20 may be utilized as an operational memory, a buffer memory, or a cache memory, just to name some non-limiting examples. For example, the memory 20 may be implemented with a volatile memory, such as a dynamic RAM (DRAM), a static RAM (SRAM), or a synchronous DRAM (SDRAM). In addition, the memory 20 may be implemented as a non-volatile memory, such as a phase-change RAM (PRAM), a magnetic RAM (MRAM), a resistive RAM (RRAM), a ferroelectric RAM (FeRAM), or a flash memory. The task queue 21 and the firmware FW may be loaded into the memory 20. A mapping table, or meta data also may be loaded into the memory 20.

The host interface 30 may provide an interface between the host 200 (FIG. 1) and the device controller 110 of the storage device 100. Examples of the host interface include but are not in any way limited to a universal serial bus (USB), an MMC, a PCIExpress (PCI-E), an AT attachment (ATA), a serial AT attachment (SATA), a parallel AT attachment (PATA), a small computer system interface (SCSI), a serial attached SCSI (SAS), an enhanced small disk interface (ESDI), or an integrated drive electronics (IDE).

The non-volatile memory interface 40 may provide an interface between the device controller 110 and the non-volatile memory 120. When a write operation is performed, the non-volatile memory interface 40 may write data stored in the memory 20 into the non-volatile memory 120 under control of the processor 10, and may store the written data in the non-volatile memory 120. When a read operation is performed, the non-volatile memory interface 40 may read data from the non-volatile memory 120 under control of the processor 10 and may provide the read data to the memory 20 for temporary storage.

Figure 3:
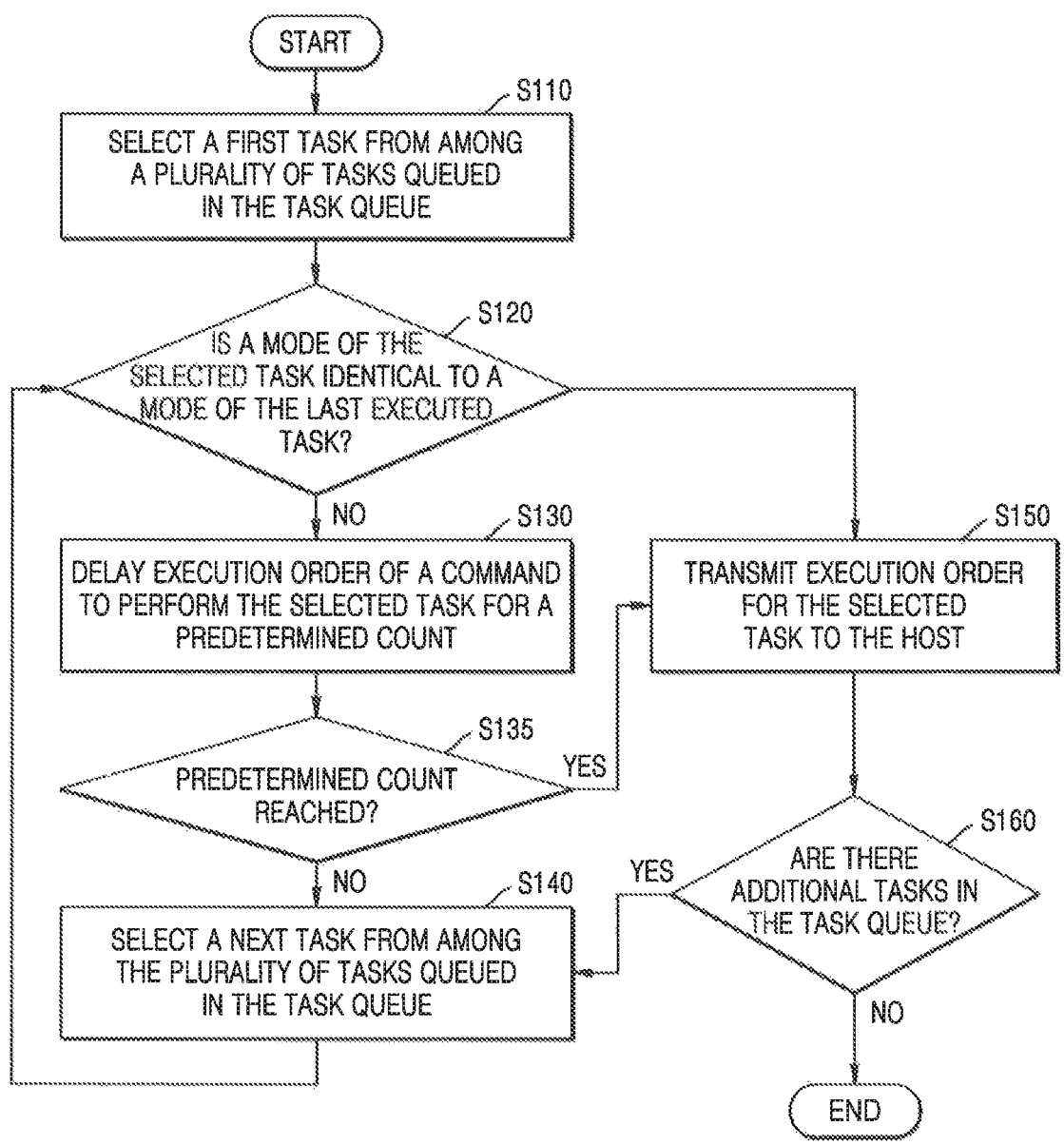
FIG. 3 is an algorithm of operating a storage device in which task execution order is based on a task mode according to an embodiment of the inventive concept.

An algorithm for performing a method of operating a storage device according to an embodiment of the inventive concept includes operations shown in FIG. 3. The method of operating the storage device illustrated by the algorithm of FIG. 3, in conjunction with FIG. 1 and FIG. 2, illustrates a determining of an execution order of tasks in the storage device that is an improvement of computer functionality over a conventional execution order of tasks that are queued in sequence without regard to the mode of the tasks. The algorithm of FIG. 3 may include operations to be performed by the storage device 100 of FIG. 1 in a time series, for example. Descriptions with reference to FIGS. 1 and 2 may be applied to the current embodiment of the inventive concept, and redundant descriptions thereof may be omitted.

Referring now to FIG. 3, at operation S110, a first task is selected from among a plurality of commands queued in a task queue 21 (shown in FIG. 1). For example, the scheduler 11 may select a first task from among a plurality of tasks queued in the task queue 21. In an embodiment of the inventive concept, the first task may be a write task. For example, the scheduler 11 may select the first task according to an order in which a plurality of write tasks are queued in the task queue 21. Meanwhile, in a case where the first task may be a read task, the scheduler 11 may select a read task in which a mapping table corresponding to an address to be accessed by the read task is loaded into the memory 20, from among a plurality of read tasks queued in the task queue 21.

At operation S120, it is determined whether a mode of the first task is identical to a mode of a previous task. In this case, the previous task is the last-executed task. For example, the scheduler 11 may check a mode of the task based on a command argument of the task and may determine whether a mode of the first task is identical to a mode of the previous task. As described above, the scheduler 11 may check the mode of the corresponding task based on mode information included the command argument, for example, a reliable write, a forced write, a data tag mode, and the like.

At operation S130, an execution order of the first task is determined based on a determination result of sameness of the mode. For example, when it is determined at operation S120 that the mode of the first task is not identical to the mode of the previous task, then at operation S130 the scheduler 11 may delay the execution order of a first command for a predetermined count. The predetermined count may be a quantity of tasks that have been selected, or a period of time that has passed.

At operation S135, if the predetermined count has not been reached, then the scheduler 11 may perform operation S140 to select another task from among the tasks queued in the task queue 21. However, if at operation S135 the predetermined count has been reached, then operation S150 may be performed so the execution order is transmitted to the host. One reason for delaying the execution order at operation S130 for a predetermined count at operation S130 is that although a selected task may be a different mode than the last executed task, the selected task should not be indefinitely delayed. Thus, for example, a count of operations or a count of time are two possible examples of how the execution order of tasks having the same mode can be grouped together without an excessive delay of a task of a different, mode. A person of ordinary skill in the art should understand and appreciate that the predetermined count may be different for different modes, and may be retrieved from a table.

If at operation S135 the predetermined count has not been reached, then operation S140 may be performed to select a next task from among the plurality of tasks queued in the task queue 21. After selecting the next task, operation S120 may be re-performed to determine whether the mode of the next task is identical to the mode of the last executed task.

Referring again to operation S120, upon the initial or any subsequent performance of this operation, when it is determined that the mode of the first task (or the currently selected task) is identical to the mode of the last executed task, then at operation S150 the scheduler 11 may transmit an execution request for the first task to the host 200.

At operation S160, the scheduler 11 determines whether there are additional tasks in the task queue 21. If there are additional tasks, the scheduler may perform operation S140 and select a next task from among the tasks in the task queue 21. If there are no additional tasks in the task queue at operation S160, the operation may end.

By transmitting execution orders for selected tasks from the task queue to the host that are of a same mode, rather than selecting the order in succession from the task queue, this embodiment of the inventive concept, as illustrated with regard to the algorithm of FIG. 3 is an improvement in computer functionality as operations of the same mode may tend to utilize the same or similar resources that, for example, may be loaded into storage, e.g., a cache memory, etc., and can reduce the time of execution of some operations, and provide a resultant savings in power, over a conventional selection and execution of tasks from a task queue.

Figure 4:
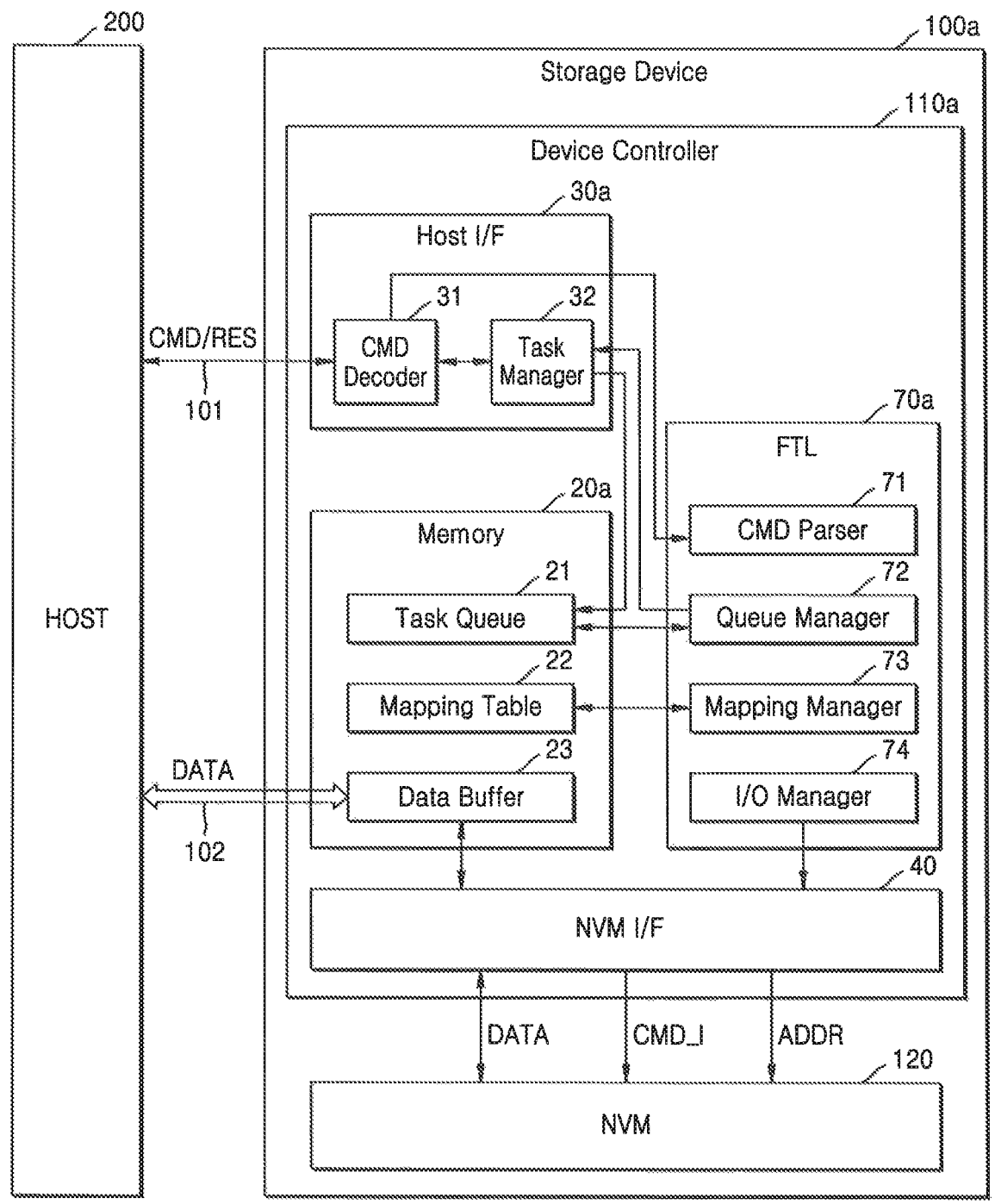
FIG. 4 is a detailed block diagram of a storage device according to an embodiment of the inventive concept.
Figure 5:
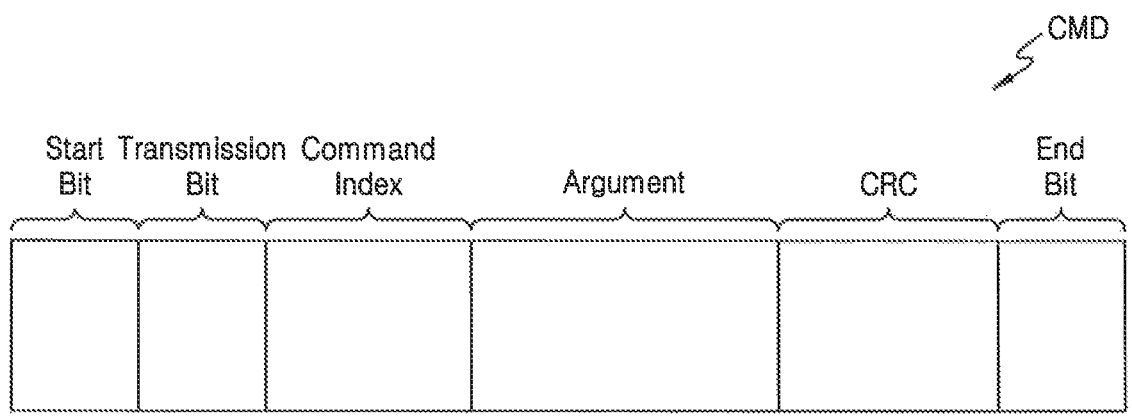
FIG. 5 is a view of a configuration of commands received by the storage device of FIG. 4.

FIG. 4 is a detailed block diagram of a storage device according to an embodiment of the inventive concept, and FIG. 5 is a view of a configuration of commands received by the storage device of FIG. 4.

Referring now to FIG. 4, a storage device 100a may include a device controller 110a and non-volatile memory 120. The device controller 110a may include memory 20a, a host interface 30a, a flash translation layer (FTL) 70a, and a non-volatile memory interface 40. The storage device 100a may correspond to an embodiment of the storage device 100 of FIG. 1, and the device controller 110a may correspond to an embodiment of the device controller 110 of FIG. 2. Thus, descriptions with reference to FIGS. 1 and 2 may be applied to the current embodiment of the inventive concept. For illustrative purposes, the storage device 100a may be an eMMC device. However, embodiments of the inventive concept are not limited to the EMMC device.

The host interface 30a may include a CMD decoder 31 and a task manager 32. The command decoder 31 may decode the commands CMD received from a host 200 and may transmit the decoded commands CMD to a CMP parser 71 of the FTL 70a.

The task manager 32 may include a status register (see 32a of FIG. 7) and may manage the status register 32a in a task identification (ID) unit. In an embodiment of the inventive concept, the task manager 32 may include a task register, and the task register may operate as a task queue.

The status register 32a (FIG. 7) may store a status of a task that is stored in the task queue 21, for example, whether the task stored in the task queue 21 is in a ready state. The task manager 32 may manage a status of each task based on the status stored in the register 32a. Thus, the task manager 32 may provide information to the host 200 about a task having completed execution preparation, e.g., information about a task being ready according to or regardless of a request of the host 200.

The memory 20a may include a data buffer 23, and the task queue 21 and the mapping table 22 may be loaded into the memory 20a. For example, one region (or a memory chip) of the memory 20a may be configured to operate as the data buffer 23, and the task queue 21 and the mapping table 22 may be loaded into another region (or another memory chip) of the memory 20a.

The task queue 21 may include a plurality of registers, and each of the plurality of registers may include task information about each of the plurality of tasks. Tasks according to the commands CMD received from the host 200, for example, task-setting commands may be sequentially stored in the task queue 21. However, the tasks are not executed in a stored order, and the queue manager 72 may determine an execution order of the tasks. In an embodiment of the inventive concept, the task manager 32 may inform to the host 200 that a predetermined task is in a ready state according to the determined execution order.

The mapping table 22 may store mapping information about a logic address received from the host 200 and a physical address of the non-volatile memory 120. In an embodiment of the inventive concept, the non-volatile memory 120 may store a plurality of mapping tables, and when power is applied to the storage device 100a, a portion of the plurality of mapping tables stored in the non-volatile memory 120 may be loaded into the memory 20a.

The data buffer 23 may store received data DATA (write data or read data) temporarily and may receive the write data from the host 200, or may transmit the read data to the host 200 under control of the host interface 30a.

The FTL 70a may manage the storage device 100a and may be implemented as firmware. The scheduler 11 of FIGS. 1 and 2 may be implemented in the FTL 70a. The FTL 70a may include a CMD parser 71, a queue manager 72, a mapping manager 73, and an input/output (I/O) manager 74. In an embodiment of the inventive concept, the FTL 70a may be loaded into a memory (for example, memory 20a) and may be executed by a processor (for example, see 10 of FIG. 2). In an embodiment of the inventive concept, the FTL 70a may be loaded into a first memory chip, and the memory 20a may be a second memory chip.

The CMD parser 71 may receive the commands CMD from the command decoder 31 and may check a command argument of the received commands CMD.

Referring to FIG. 5, the commands CMD may include a plurality of bits, such as a start bit, a transmission bit, a command index, an argument, a cyclical redundancy check (CRC), and an end bit.

The start bit indicates start of the commands CMD. For example, the start bit may be fixed to 0. The transmission bit indicates a subject for generating the commands CMD. For example, when the transmission bit is 1, the transmission bit may indicate that the commands CMD are generated by the host 200. The command index that is a plurality of bits indicating types of the commands CMD may indicate a specific command from among the plurality of commands CMD to be executed by the storage device 100. For example, when the command index is CMD 1, the command index may indicate that the commands CMD are write commands, and when the command index is CMD 2, the command index may indicate that the commands CMD are read commands. Thus, the storage device 100 may recognize a command to be input according to the command index and may perform operations according to the corresponding command index.

The command argument may include information to perform the operations according to the commands CMD. For example, when the commands CMD are read commands or write commands, the command argument may include an address, e.g., a start address information of a memory cell array of a non-volatile memory (see 120 of FIG. 1) to be read or written, and data size information of read data or write data. Also, when the commands CMD are write commands, the command argument may include all information such as reliable write, forced write, a data tag mode, and the like.

The CRC may be used to detect errors that may occur during transmission of the commands CMD. For example, the CRC may be implemented with 7 bits. The end bit may be a bit indicating end of the commands CMD. For example, the end bit may be fixed to 1.

The CMD parser 71 may extract an address, a data size, a mode information, and the like from the command argument and may store them as task information in the task queue 21.

The queue manager 72 may select one from among the plurality of tasks queued in the task queue 21 and may determine whether the selected task is in a ready state. In an embodiment, the queue manager 72 may determine whether a mode of the selected task is identical to a mode of the previous task, e.g., a mode of the last-executed task. The queue manager 72 may determine whether the selected task is in a ready state based on whether the mode of the selected task is identical to the mode of the last executed task. Furthermore, the queue manager 72 may update the status register 32a included in the task manager 32 when the selected task is determined to be in the ready state.

The mapping manager 73 may manage the mapping table 22. For example, when a physical address about the logic address is changed, the mapping manager 73 may store mapping information about the physical address regarding the changed logic address in the mapping table 22 and thus may update the mapping table 22.

The I/O manager 74 may issue a write command to be provided to the non-volatile memory 120 in response to a write task execution command (for example, CMD47). Also, the I/O manager 74 may issue a read command to be provided to the non-volatile memory 120 in response to a read task execution command (for example, CMD46). In this case, the I/O manager 74 may acquire a physical address corresponding to the write command/read command by referring to the mapping table 22.

The non-volatile memory interface 40 may provide an interface between the device controller 110 and the non-volatile memory 120 and may be implemented with a flash interface layer (FIL). The non-volatile memory interface 40 may provide an internal command CMD_I generated based on the commands CMD received from the host 200 and an address ADDR, for example, a physical address, to the non-volatile memory 120 and thus may write data DATA into the non-volatile memory 120 or may read the data DATA from the non-volatile memory 120.

Figure 6:
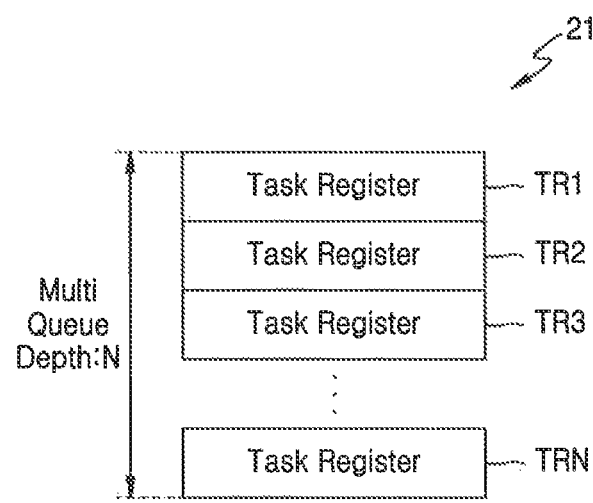
FIG. 6 is a detailed block diagram of a task queue according to an embodiment of the inventive concept.

FIG. 6 is a detailed block diagram of the task queue 21 according to an embodiment of the inventive concept.

Referring to FIG. 6, the task queue 21 may include first through Nth task registers TR1 to TRN, and the first through Nth task registers TR1 to TRN may store information about each of first through Nth tasks. Here, N is the number of task registers and is a natural number that is equal to or greater than 2. N may be defined as a multi-queue depth, and the device controller (see 110a of FIG. 4) may receive a multi-queue command as much as the multi-queue depth N from the host 200 and may store the multi-queue command in the first through Nth task registers TR1 to TRN. Task information including a task ID, a transmission direction information, a data size, a priority, mode information, and an address may be stored in each of the first through Nth task registers TR1 to TRN.

Figures 7, 8:
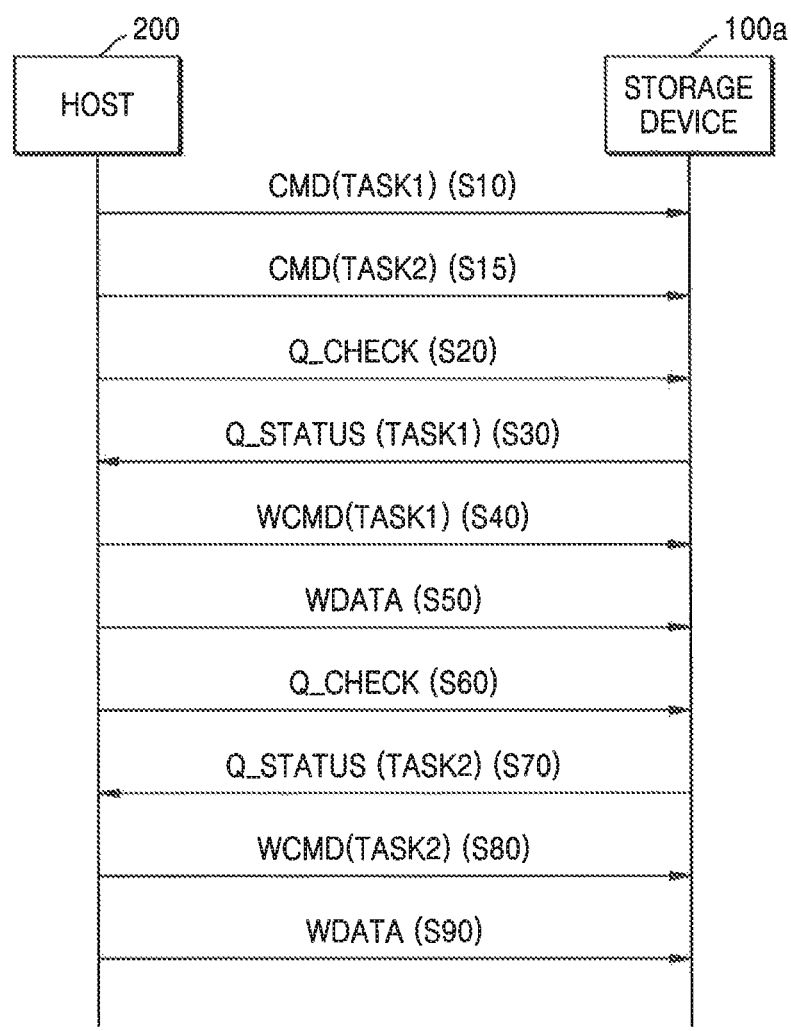
FIG. 7 is a detailed block diagram of a status register according to an embodiment of the inventive concept.
FIG. 8 is a flowchart providing an algorithm of operations to be performed between a host and a storage device according to an embodiment of the inventive concept.

FIG. 7 is a detailed block diagram of the status register 32a according to an embodiment of the inventive concept.

Referring to FIGS. 4 through 7, the status register 32a may store statuses of the first through Nth tasks stored in the first through Nth task registers TR1 to TRN of the command queue 21. In detail, the status register 32a may store status information of N bits indicating statuses of the first through Nth tasks. For example, a first bit (for example, a least significant bit (LSB), may indicate whether the execution preparation of the first task is completed (hereinafter, referred to as a "ready state") or not (hereinafter, referred to as a "not ready state"). For example, an Nth bit (for example, a most significant hit (MSB) may indicate whether the Nth task is in a ready state or not ready state.

In an embodiment of the inventive concept, all initial values of the status register 32a may be "0". When one task from among the first through Nth tasks is in the ready state, a corresponding bit of the status register 32a may be changed to "1". In an embodiment of the inventive concept, when the queue manager 72 of the FTL 70a determines the task selected in the task queue 21 as in the ready state, the queue manager 72 of the FTL 70a may update the corresponding bit of the status register 32a. However, embodiments of the inventive concept are not limited thereto, and the task manager 32 may also check a state of a task stored in the task queue 21 and may update a corresponding bit of the statue register 32a.

FIG. 8 is a flowchart providing an algorithm of operations to be performed between a host and a storage device according to an embodiment of the inventive concept. Hereinafter, operations to be performed between the storage device 100a and the host 200 will be described with reference to FIGS. 4 through 8.

At operation S10, the host 200 transmits a task setting/address command for a first task TASK1 in a storage device 100a. For example, the first task TASK1 may be a write task. Even while data for the previous task is transmitted via a plurality of data channels 102, the host 200 may transmit the task setting/address command for the first task TASK1 to the storage device 100a. A command decoder 31 of the storage device 100a may transmit the task setting/address command for the first task TASK1 to the CMD parser 71, and the CMD parser 71 may store task information about the first task TASK1 in the task queue 21. For example, the task information about the first task TASK1 may be stored in a first task register TR1. Thus, the first task TASK1 is enqueued.

For example, the host 200 may transmit the task setting command (for example, CMD44) for the first task TASK1 to the storage device 100a and subsequently may transmit the address command (for example, CMD45) for the first task TASK1 to the storage device 100a. However, embodiments of the inventive concept are not limited thereto, and address information may be also included in one command, for example, the task setting command CMD44.

The task setting command (for example, CMD44) is a command for setting an ID of a task and an operation direction of the task, and the operation direction of the task is a transmission direction of data. In detail, the task setting command (for example, CMD44) may include a task ID, a transmission direction information indicating a transmission direction of data, size information for designating the size of data to be written into or read from the non-volatile memory 120, priority information, and mode information.

The task address command (for example, CMD45) may include start address information about data of the corresponding task, and a start address of the data may be a logic address. For example, when the task is a "write task", the start address information may be information for designating a start address of the data to be written into the non-volatile memory 120. Also, for example, when the task is a "read task", the start address information may be information for designating a start address of the data to be read from the non-volatile memory 120.

At operation S15, the host 200 stores a task setting/address command for a second task TASK2 in the storage device 100a. For example, the second task TASK2 may also be a write task. The command decoder 31 of the storage device 100a may transmit the task setting/address command for the second task TASK2 to the CMD parser 71, and the CMD parser 71 may store task information about the second task TASK2 in the task queue 21. For example, the task information for the second task TASK2 may be stored in a second task register TR2. In this way, before transmitting data for the first task TASK1 to the storage device 100a, the host 200 may transmit the task setting address command for the second task TASK2 that is another task to the storage device 100a.

At operation S20, the host 200 transmits a status check command Q_CHECK for checking a status stored in the status register 32a to the storage device 100a. The status check command Q_CHECK is a command defined to check a preparation status of each task stored in the task queue 21. For example, the status check command Q_CHECK may be a SEND_STATUS command (for example, CMD13).

At operation S30, the storage device 100a transmits a status response message Q_STATUS to the host 200 in response to the status check command Q_CHECK. For example, the status response message Q_STATUS may indicate that the first task TASK1 is in a ready state.

At operation S40, the host 200 may transmit a write execution command WCMD for the first task TASK1 to the storage device 100a.

At operation S50, the host 200 may transmit write data WDATA relating to the first task TASK1 to the storage device 100a. The storage device 100a may receive the write data WDATA, may store the received write data WDATA in the data buffer 23 and may program the stored write data WDATA into the non-volatile memory 120. In an embodiment, when data in a program unit is stored in the data buffer 23, the host 200 may program the data into the non-volatile memory 120.

At operation S60, the host 200 may transmit the status check command Q_CHECK for checking a status stored in the status register 32a to the storage device 100a. Operation S60 may be performed periodically or non-periodically.

At operation S70, the storage device 100a transmits a status response message Q_STATUS to the host 200 in response to the status check command Q_CHECK. For example, the status response message Q_STATUS may indicate that the second task TASK2 is in a ready state.

At operation S80, the host 200 may transmit the write execution command WCMD for the second task TASK2 to the storage device 100a. At operation S90, the host 200 may transmit the write data WDATA relating to the second task TASK2 to the storage device 100a.

According to this embodiment of the inventive concept, when the first task TASK1 and the second task TASK2 are in the ready state, the host 200 may transmit an execution command and data for each task to the storage device 100a.

The task may be performed in three operations, such as enqueuing, ready, and execution. As described above, the host 200 transmits the task setting/address command to the storage device 100a so that the task may be enqueued. The host 200 transmits the execution command to the storage device 100a so that the task may be executed. However, the ready of the task may be internally determined by the storage device 100a. As described above, the storage device 100a, for example, the queue manager 72, may determine whether the tasks are in ready states, e.g., an execution order of the tasks being based on a mode or an address of a task extracted from a command argument of the task.

In the current embodiment of the inventive concept, it is assumed that the first task TASK1 and the second task TASK2 are write tasks. However, the first task TASK1 and the second task TASK2 may be read tasks. Alternatively, one of the first task TASK1 and the second task TASK2 may be a write task, and the other one thereof may be a read task.

Figure 9:
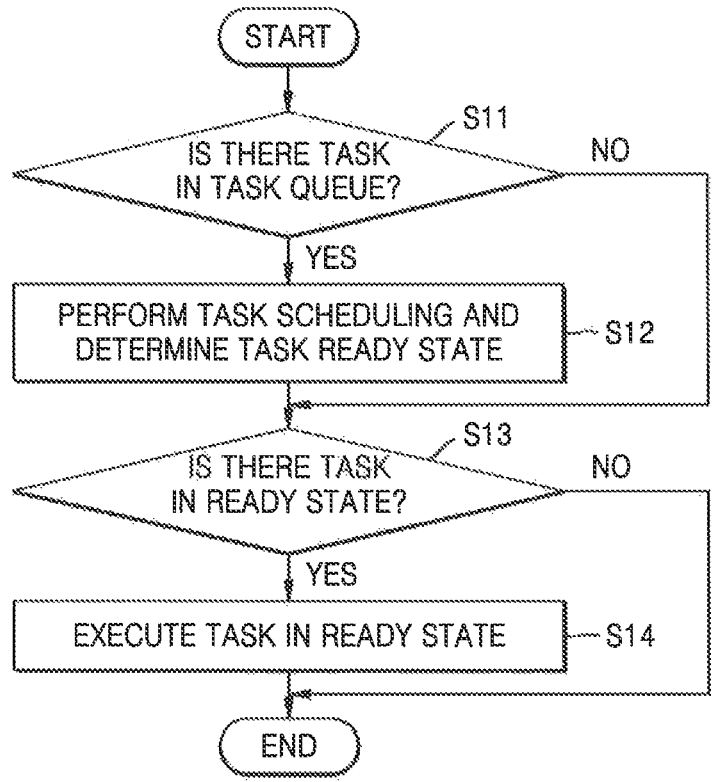
FIG. 9 is a flowchart providing an algorithm of a test processing method in a storage device according to an embodiment of the inventive concept.

FIG. 9 is a flowchart providing an algorithm for a task processing operation of a storage device according to an embodiment of the inventive concept. An input/output process according to the current embodiment may include operations to be performed by the storage device 100a of FIG. 4 in a time series, for example. Descriptions with reference to FIG. 4 may be applied to the current embodiment, and redundant descriptions thereof will be omitted.

Referring to FIG. 9, at operation S11, where it is determined whether there is a task in a ready state, it may be first be determined whether there is a task in a task queue 21. For example, the queue manager 72 may check whether there is a task in a "not ready" state in the task queue 21. For example, the queue manager 72 may check the task queue 21 or the status register 32a and may determine whether there is a task in a not ready state in the task queue 21.

At operation S12, when there is a task in a not ready state in the task queue 21, the queue manager 72 may perform task scheduling and may determine a task ready state. According to embodiments of the inventive concept, the queue manager 72 may determine an execution order of tasks according to a task scheduling method as described herein, and may determine ready states of the tasks according to the execution order.

Subsequently, at operation S13, it may be checked whether there is a task in a ready state in the task queue 21. At operation S14, when there is a task in the ready state in the task queue 21, such a task may be executed. For example, the task manager 32 checks the status register 32a, thereby checking whether there is the task in the ready state in the task queue 21, and when there is the task in the ready state in the task queue 21, the task manager 32 may notify the host 200 about the ready task. When an execution command for the ready task is received from the host 200, the FTL 70a may execute the task in the ready state.

Figure 10:
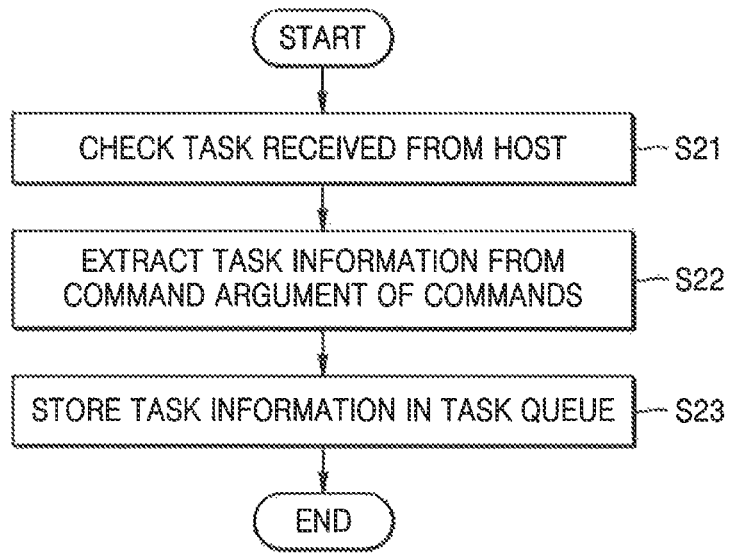
FIG. 10 is a flowchart providing an algorithm of a task enqueuing method in a storage device according to an embodiment of the inventive concept.

FIG. 10 is a flowchart providing an algorithm for a task enqueuing operation in a storage device according to an embodiment of the inventive concept.

The task enqueuing operation according to the current embodiment of the inventive concept may include operations to be performed by the storage device 100a of FIG. 4 in a time series, for example. Thus, descriptions with reference to FIG. 4 may be applied to the current embodiment.

Referring to FIG. 10, at operation S21, a task received from the host 200 may be checked. For example, when a task setting/address command is received from the host 200, the command decoder 31 may transmit the task setting/address command to the FTL 70a, and the FTL 70a may check the task setting/address command.

At operation S22, task information may be extracted from the command argument of the commands. In addition, at operation S23, the task information may be stored in the task queue 21. For example, the CMD parser 71 may extract an address, a data size, mode information, and the like from the command argument and may store them as the task information in the task queue 21.

In an embodiment of the inventive concept, the FTL 70a of the storage device 100a may perform the task processing operation of FIG. 9 repeatedly, and when the task setting/address command is received from the host 200, the host interface 30a may inform the FTL 70a that the task is received from the host 200, through interrupt processing. The FTL 70a may stop the task processing operation and may enqueue the task according to the task enqueuing operation described with reference to FIG. 10. Subsequently, the FTL 70a may restart the task processing operation.

Figure 11:
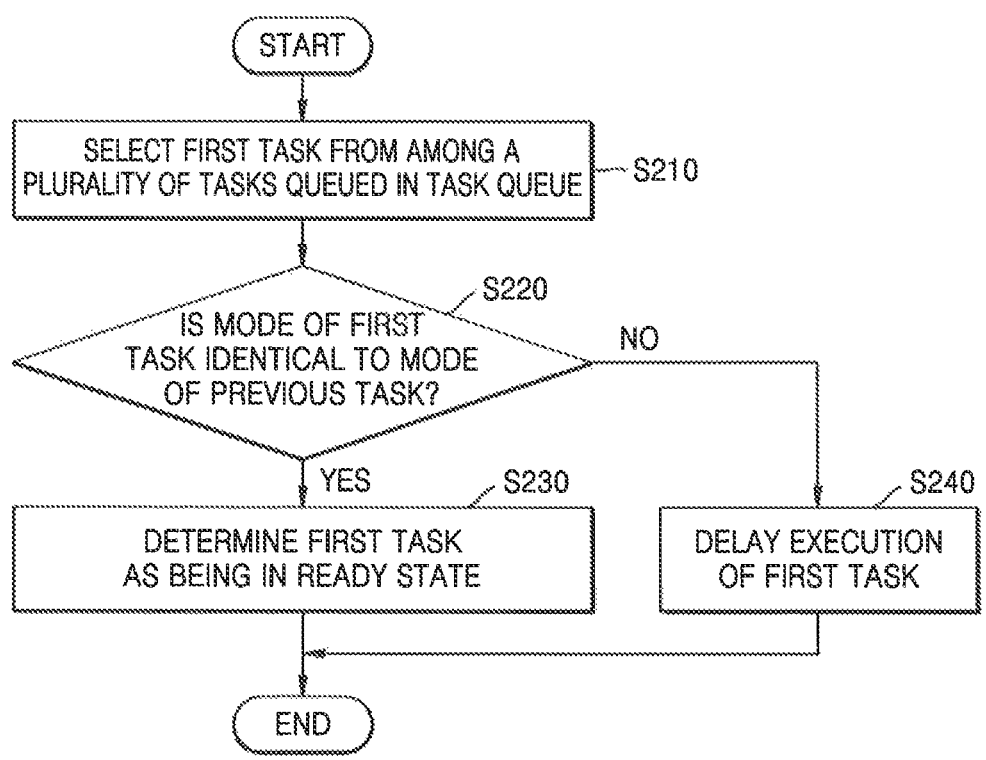
FIG. 11 is a flowchart providing an algorithm for a method of operating a storage device according to an embodiment of the inventive concept.

FIG. 11 is a flowchart providing an algorithm for a method of operating a storage device according to an embodiment of the inventive concept.

Referring now to FIG. 11, the method of operating the storage device according to the current embodiment of the inventive concept includes determining an execution order of tasks in the storage device that may include operations to be performed by the storage device 100a of FIG. 4 in a time series, for example. Descriptions with reference to FIG. 4 may be applied to the current embodiment, and redundant descriptions thereof will be omitted.

At operation S210, a first task is selected from among a plurality of tasks queued in the task queue 21. For example, the queue manager 72 may select the first task from among the plurality of tasks queued in the task queue 21. In an embodiment of the inventive concept, the first task may be a write task. In addition, the queue manager 72 may select the first task based on a queuing order, a priority, and the like. For example, the queue manager 72 may select a first-enqueued task from among the plurality of tasks queued in the task queue 21.

At operation S220, it is determined whether a mode of a first task is identical to a mode of the previous task. For example, the queue manager 72 may determine the modes of the first task and the previous task are identical based on task information about the first task and the previous task stored in the task queue 21. As described above, mode information extracted from a command argument corresponding to the task are stored as task information in the task queue 21. Thus, the queue manager 72 may compare mode information about the first task stored in the task queue 21 with mode information about the previous task (e.g. last-executed task), it can be determined whether the modes are the same.

For example, when a regular write is set to the command argument of the previous task, and a reliable write or forced write is set to the command argument of the selected task, the queue manager 72 may determine that the mode of the selected task is not identical to the mode of the previous task, because a write mode of the previous task is a performance write mode and a write mode of the selected task is a reliable write mode.

At operation S230, when it is determined that the mode of the first task is identical to the mode of the previous task, the first task may be determined as being in a ready state. As the first task is determined in a state in which execution preparation thereof is completed, the first task may be executed subsequent to the previous task.

At operation S240, when it is determined that the mode of the first task is not identical to the mode of the previous task, execution of the first task may be delayed. For example, when there is another task in a not ready state in the task queue 21, the queue manager 72 may determine whether said another task is executed.

Figure 12:
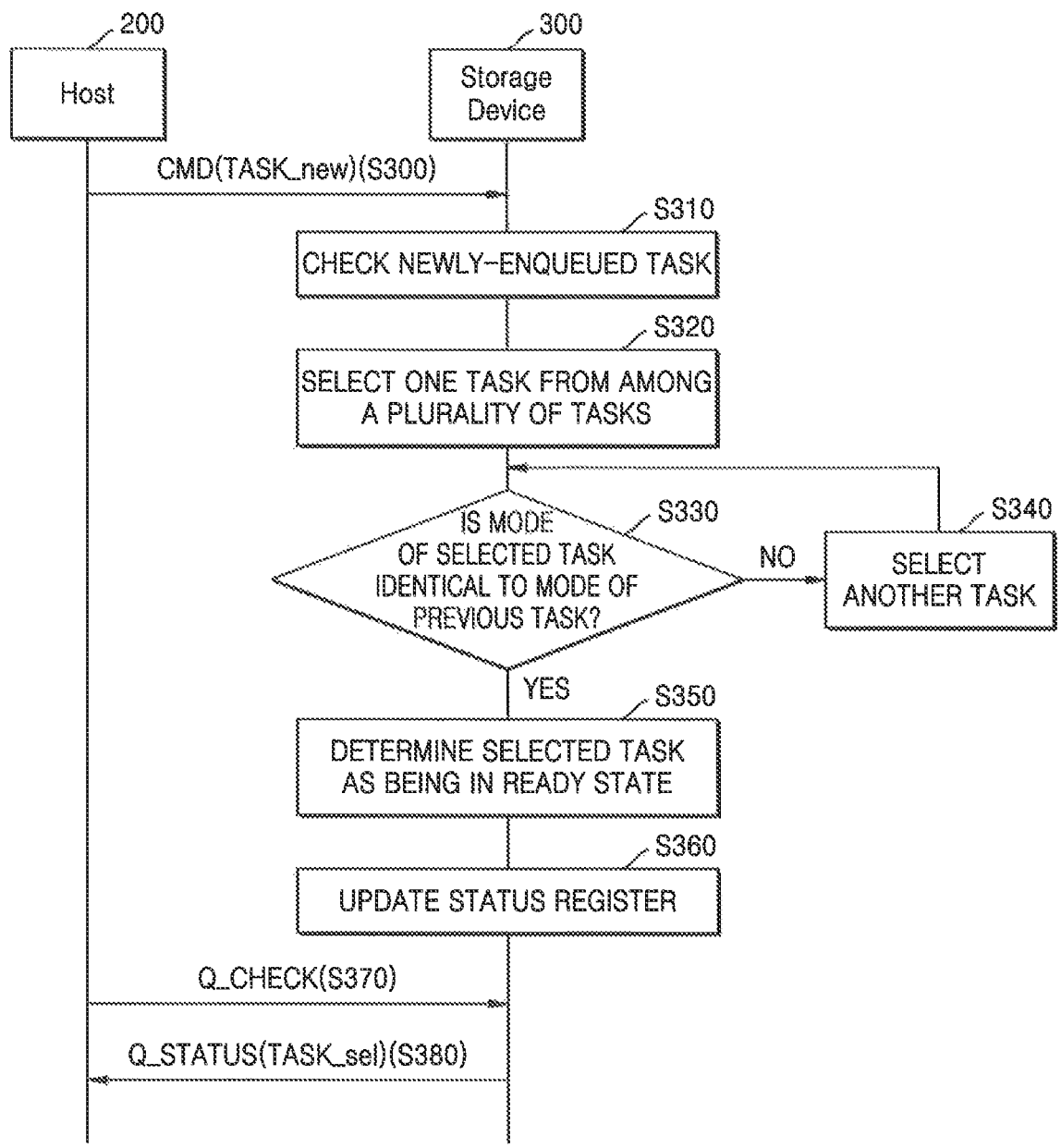
FIG. 12 is a flowchart providing an algorithm for operations to be performed between a host and a storage device according to an embodiment of the inventive concept.

FIG. 12 is a flowchart providing an algorithm of operations that may be performed between a host and a storage device according to an embodiment of the inventive concept.

Referring to FIGS. 4 and 12, at operation S300, the host 200 transmits a task setting/address command for a new task TASK_new to the storage device 100a. The command decoder 31 of the storage device 100a may transmit the task setting/address command for the new task TASK_new to the CMD parser 71, and the CMD parser 71 may store the task information about the new task TASK_new in the task queue 21.

At operation S310, the storage device 100a checks the newly-enqueued task. In detail, the queue manager 72 may check a task queued in the task queue 21, for example, the new task TASK_new.

At operation S320, the storage device 100a may select one from among a plurality of tasks. In more detail, the queue manager 72 may select one task from among the plurality of tasks queued in the task queue 21.

At operation S330, The storage device 100a determines whether the mode of the selected task is identical to the mode of the previous task. The queue manager 72 may determine whether the mode of the selected task is identical to the mode of the previous task based on the task information stored in the task queue 21, for example, the mode information extracted from the command argument.

At operation S340, as a result of the determination at operation S330a, when the mode of the selected task is not identical to the mode of the previous task, the queue manager 72 selects another task. In detail, the queue manager 72 may select another task from among the plurality of tasks queued in the task queue 21 and may perform operation S330 again.

At operation S350, as a result of the determination at S330, when the mode of the selected task is identical to the mode of the previous task, the selected task is determined as being in the ready state, and at operation S360 the status register 32a is updated. For example, the queue manager 72 may determine the selected task as being in the ready state and may change a bit corresponding to the selected task in the status register 32a from 0 to 1.

At operation S370, the host 200 transmits the status check command Q_CHECK for checking a status stored in the status register 32a to the storage device 100a. Performing operation S370 is not limited to the time directly after performing operation S360 and may be performed at an arbitrary time while Operations S300 and S380 are being performed.

At operation S380, the storage device 100a transmits the status response message Q_STATUS to the host 200 in response to the status check command Q_CHECK. For example, the status response message Q_STATUS may indicate that a selected task TASK_sel is in a ready state.

Figure 13:
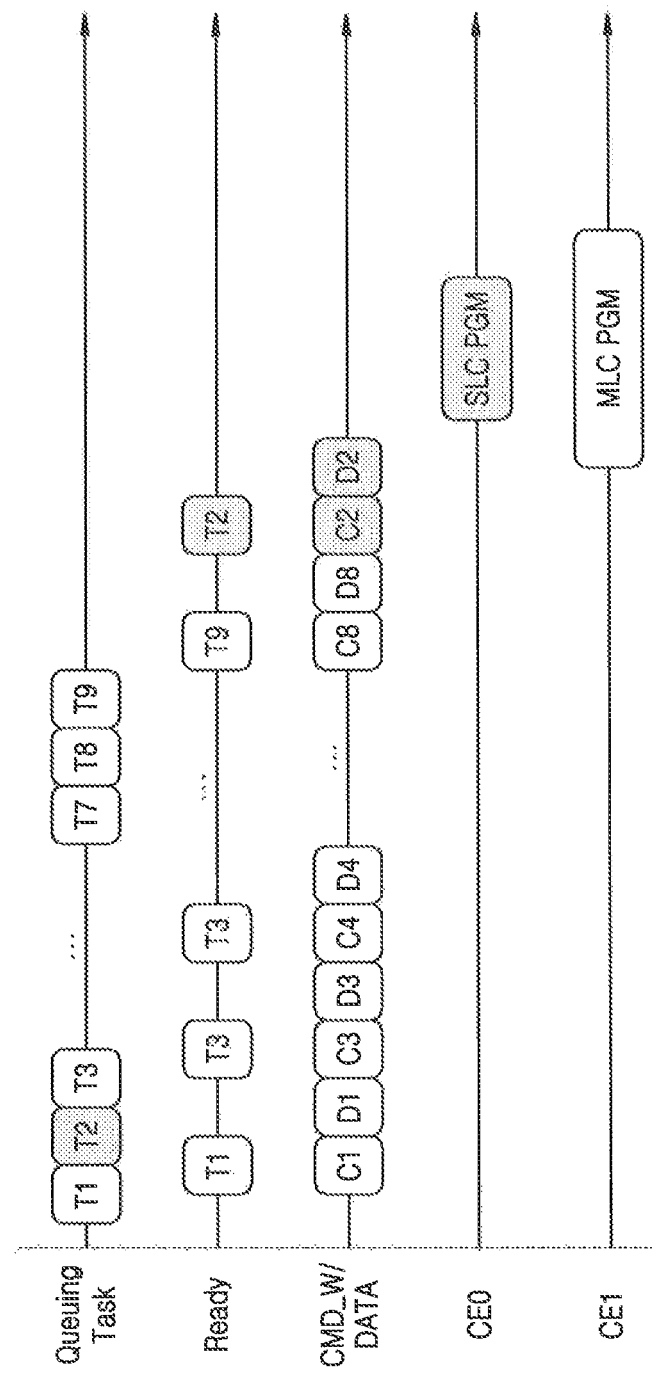
FIG. 13 is a view of operations of a storage device according to an embodiment of the inventive concept.

FIG. 13 is a view of operations of a storage device according to an embodiment of the inventive concept.

In FIG. 13, it is assumed that the storage device 100a supports a cache-on mode and a task queue function. Also, a case where tasks T1 to T9 are write tasks, a write mode of the second task T2 from among the tasks T1 to T9 is a reliable write mode and write modes of other tasks T1, T3 to T9 are performance write modes, will be described.

Referring to FIGS. 4 and 13, the tasks T1 to T9 may be queued in the task queue 21 of the storage device 100a. The first-enqueued first task T1, from among the queued tasks T1 to T9, may be in a ready state. Accordingly, a write execution command C1 and the first data D1, which corresponds to the first task T1, may be received from the host 200. Due to the first task T1 being in a performance write mode, the storage device 100a may store the first data D1 in the data buffer 23 and may not perform a program until data in a program unit is stored in the data buffer 23.

After the first task is executed, one task may be selected from among the queued second task through the ninth task T2 to T9. In view of an enqueuing time, the second task T2 may be executed. However, because a write mode of the second task T2 is different from write mode of the previous task, e.g., the first task T1, execution of the second task T2 may be delayed. The third task T3 through ninth task T9, which are in the same performance write modes as that of the first task T1, may be sequentially executed.

The first data D1 corresponding to the first task T1 and the third data D3 through the ninth data D9 corresponding to the third task T3 through the ninth task T9 may be stored in the data buffer 23 so that data in the program unit may be stored in the data buffer 23. For example, if the data buffer 23 is full, the storage device 100a may flush the data stored in the data buffer 23, e.g., the first data D1, and the third data D3 through the ninth data D9, from the data buffer 23 and program the data into the non-volatile memory 120. The storage device 100a may make program preparation and may also execute the second task T2. The second task T2 may be in a ready state, and a write execution command C2 and second data D2, which correspond to the second task T2, may be received from the host 200. Because the second task T2 is a reliable write mode, the received, second data D2 may be programmed into the non-volatile memory 120.

The storage device 100a may program the second data D2 and data stored in the data buffer 23, e.g., the first data D1 and the third through ninth data D3 to D9 into different memory devices, for example, a first memory device CE0 and a second memory device CE1, in an interleaving manner. The first memory device CE0 and the second memory device CE1 may be connected to different channels or ways. For example, the first memory device CE0 may include single level cells, and the second data D2 may be single-level programmed into the first memory device CE0, and the second memory device CE1 may include multi-level cells, and the data stored in the data buffer 23 may be multi-level programmed into the second memory device CE1.

The storage device 100a according to an embodiment of the inventive concept may firstly perform tasks in performance write modes through task scheduling, and may delay execution of tasks in reliable write modes to program the data in an interleaving manner. Thus, the performance of the storage device 100a may be increased.

Figure 14A:
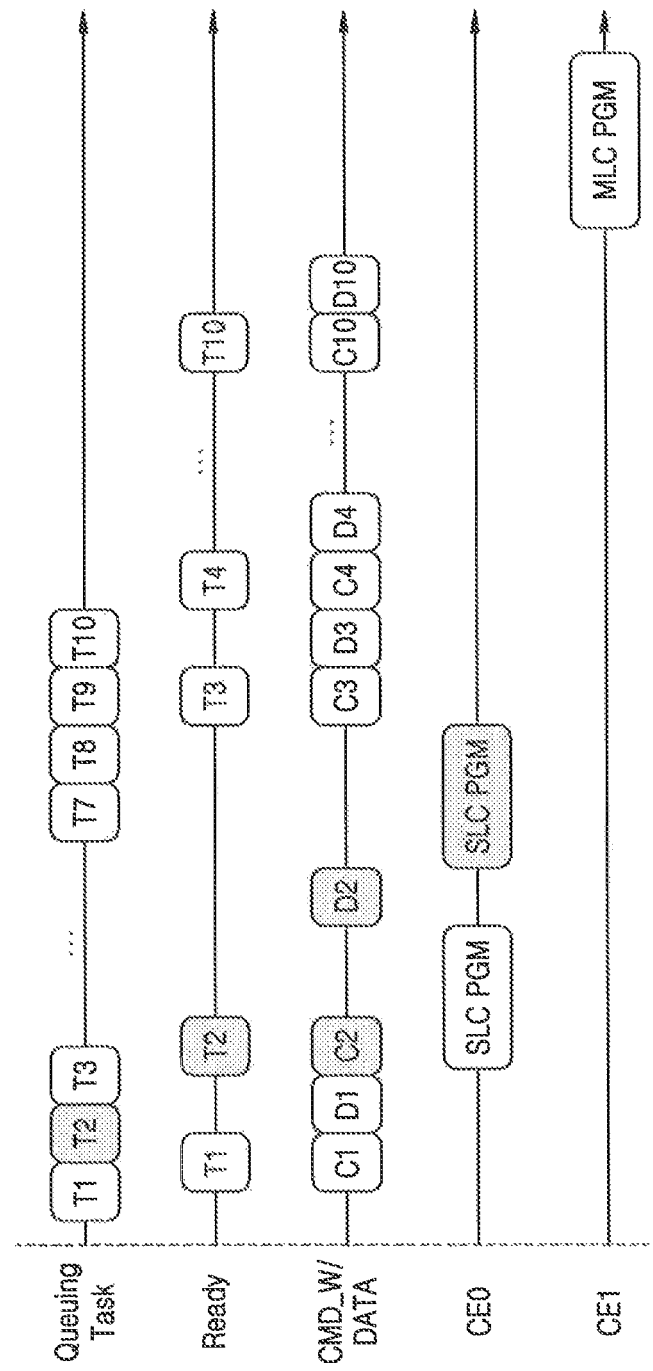
Figure 14B:
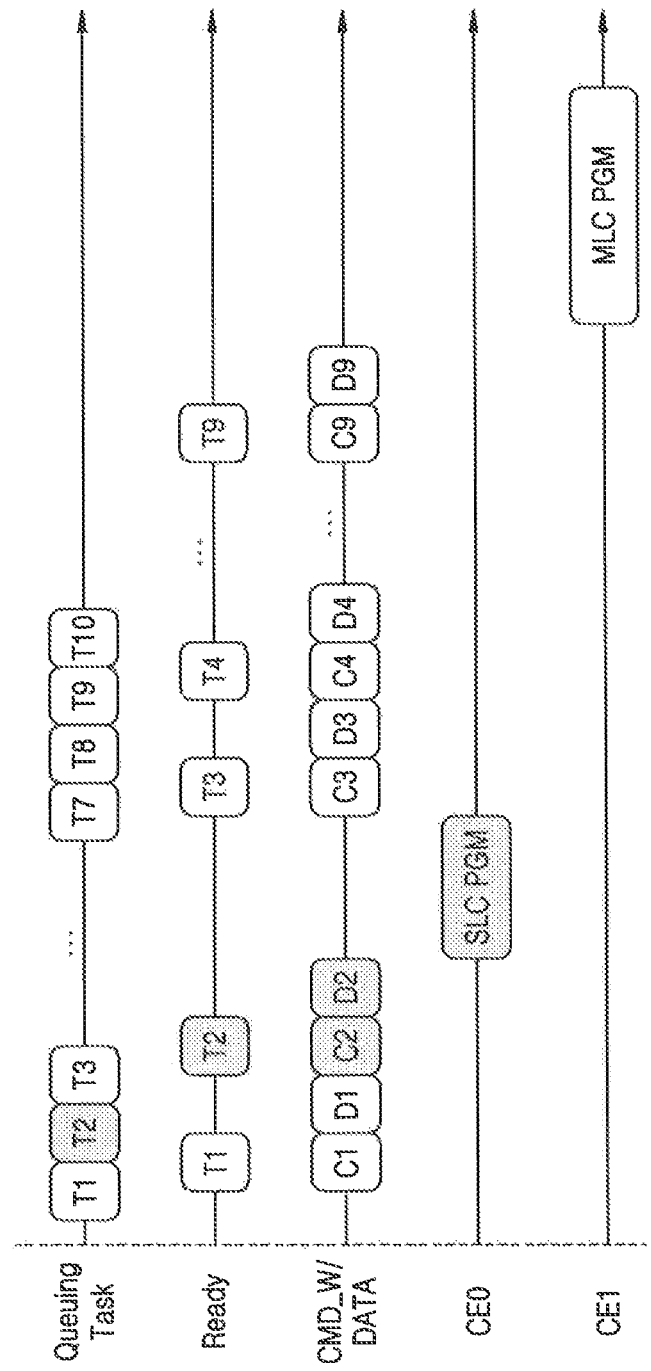

FIGS. 14A and 14B are comparative examples of operations of a storage device according to an embodiment of the inventive concept. FIG. 14A is an example of operations in which the data is programmed into a non-volatile memory, and FIG. 14B is an example of operations in which the data is not programmed into the non-volatile memory.

Referring to FIGS. 14A and 14B, the storage device may execute queued tasks sequentially in a queued order.

Referring first to FIG. 14A, the data may be programmed into non-volatile memory according to the received order. The first task T1 may be in a ready state and may be executed. A write execution command C1 and first data D1, which correspond to the first task T1, may be received from the host 200. Due to the first task T1 being in a performance write mode, the storage device may store the first data D1 in the data buffer 23. Then, the second task T2 may be executed. Second data D2, which corresponds to the second task T2, may be directly programmed into the non-volatile memory 120 and the storage device to ensure that the data is programmed according to the received order. Thus, before the second task T2 in a reliable write mode is executed, the first data D1 corresponding to the first task T1 having a performance write mode, may be flushed in the data buffer 23 and may be programmed into the non-volatile memory 120. In this case, after programming of the first data D1 into the non-volatile memory 120 is completed, the host 200 may transmit the second data D2 to the storage device so the interleaving programming of the first data D1 and the second data D2 is not possible. Also, a size of the first data D1 is smaller than the program unit, the first data D1 may be a single-level program into the first memory device CE0. Thus, the performance of the storage device may be degraded as compared with the operations depicted in FIG. 13

Referring now to FIG. 14B, in a state in which the first data D1 of the first task T1 in a performance write mode is stored in a data buffer 23 but is not programmed into the non-volatile memory 120, the second task T2 may be executed. Because the second task T2 is in the reliable write mode, after programming of the second data D2 is completed, the next task (for example the third task T3) may be executed. The third task T3 through the ninth task T9 in the performance write mode may be executed. Meanwhile, the third data D3 through the ninth data D9 corresponding to the third task T3 through the ninth task T9 may be stored in the data buffer 23. If the data buffer 23 becomes full, the data stored in the data buffer 23, e.g., the first data D1, and the third data D3 through the ninth data D9, is programmed into the non-volatile memory 120. However, this operation takes time and the next program command is delayed until the programming of the second data D2 corresponding to the second task T2 in the reliable write mode is completed. Thus, the performance of the storage device of the example shown in FIG. 14B may be degraded as compared with the operations depicted in FIG. 13.

As described above with reference to FIGS. 14A and 14B, when the task in the reliable write mode is executed in the middle of the execution of tasks in the performance write modes, interleaving programming is not possible, and the performance of the storage device is degraded. However, as described above with reference to FIG. 13, the storage device 100a according to an embodiment of the inventive concept performs task scheduling so that tasks in the same modes may be sequentially executed and thus execution of tasks in the reliable write modes may be delayed so that interleaving programming is possible, and the performance of the storage device 100a may be increased.

Figure 15:
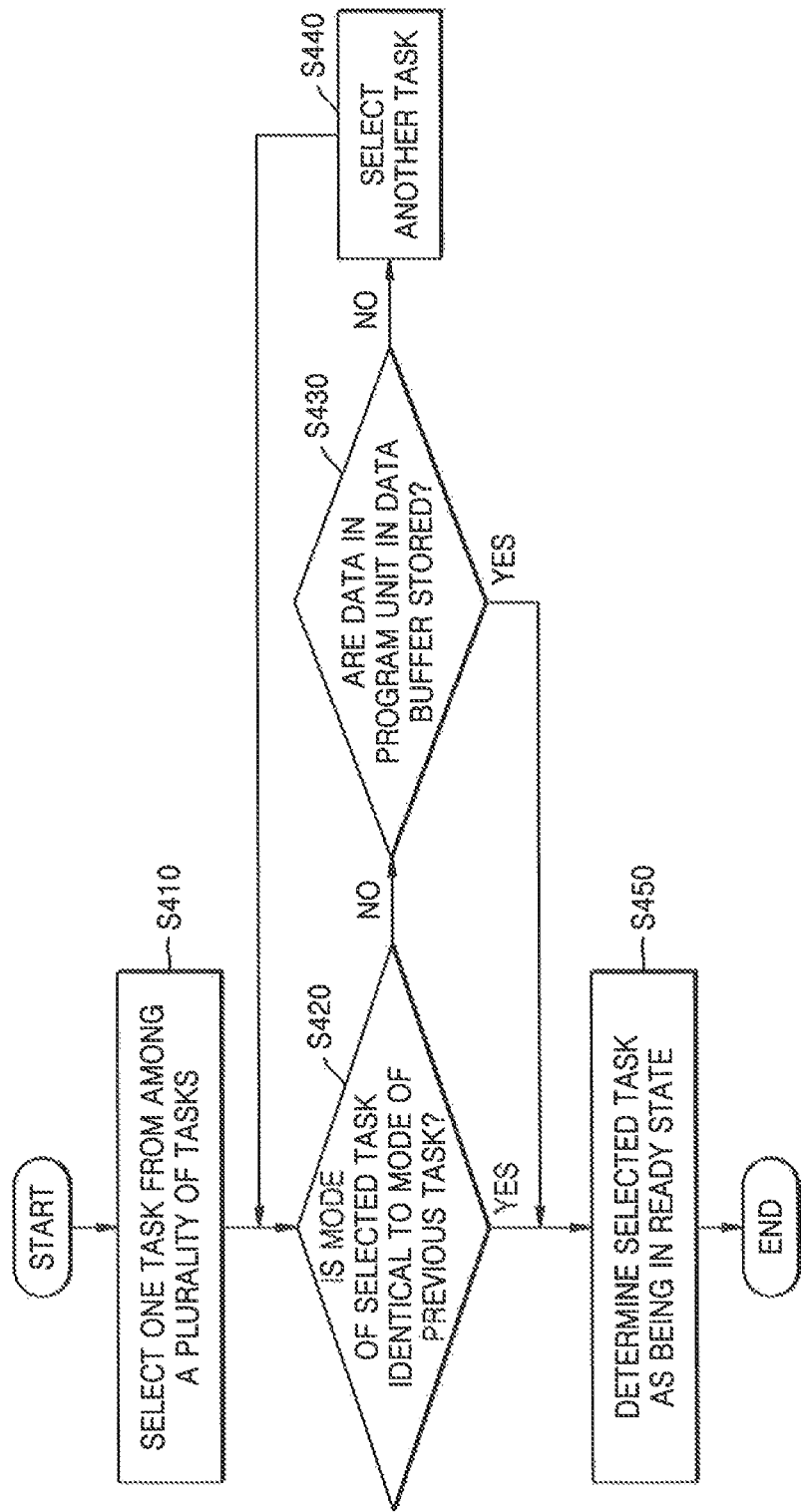
FIG. 15 is a flowchart providing an algorithm for a method of operating a storage device according to an embodiment of the inventive concept.

FIG. 15 is a flowchart providing an algorithm for a method of operating a storage device according to another embodiment of the inventive concept.

The method of operating the storage device according to the current embodiment that is a method of determining an execution order of tasks in the storage device may include operations to be performed by the storage device 100a of FIG. 4 in a time series. Also, the current embodiment may correspond to a modified embodiment of FIG. 12, and descriptions with reference to FIG. 12 may be applied to the current embodiment, and redundant descriptions thereof will be omitted.

Referring to FIG. 15, at operation S410, one task may be selected from among a plurality of tasks, and at operation S420 it may be determined whether a mode of a selected task is identical to a mode of the previous task. The queue manager 72 may determine whether a mode of the selected task is identical to a mode of the previous task based on task information stored in the task queue 21.

As a result of the determination, when the mode of the selected task is not identical to the mode of the previous task, at operation 430 it may be determined whether data in a program unit are stored in a data buffer 23. When the data in the program unit are not stored in the data buffer 23, another task may be selected (operation S440), and operation 8420 may be performed.

At operation S450, when the mode of the selected task is identical to the mode of the previous task or the data in the program unit are stored in the data buffer 23, the selected task is determined as being in the ready state.

While the program is executed, for efficient write, when the data in the program unit are stored in the data buffer 23, the program may be executed. According to the current embodiment, as described above, scheduling may be performed so that the tasks in the same modes may be consecutively executed for improvements in the performance of the storage device 100a, and when the data in the program unit are stored in the data buffer 23, a task in a different mode may be executed so that execution of the task in the different mode may be prevented from being excessively delayed.

Figure 16:
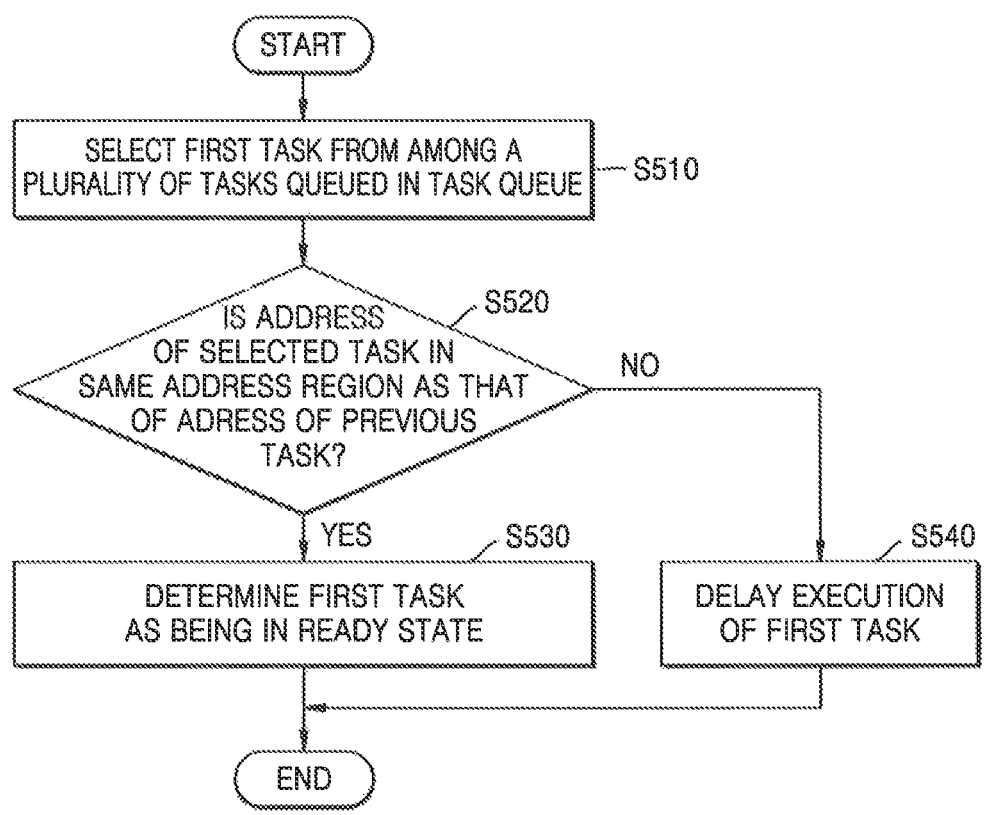
FIG. 16 is a flowchart providing an algorithm for a method of operating a storage device according to an embodiment of the inventive concept.

FIG. 16 is a flowchart providing an algorithm for a method of operating a storage device according to an embodiment of the inventive concept. The method of operating the storage device according to the current embodiment that is a method of determining an execution order of tasks in the storage device may include operations to be performed by the storage device 100a of FIG. 4 in a time series, for example.

Referring to FIG. 16, at operation S510, a first task is selected from among a plurality of tasks queued in the task queue 21, and at operation S520, it may be determined whether an address of the first task is in the same address region as that of an address of the previous task. For example, the queue manager 72 may check the address of the first task and the address of the previous task in the task information stored in the task queue 21 and may determine whether the address of the first task is in the same address region as that of the previous task. In this case, the address region may be a unit address region in which the device controller 110 internally divides the non-volatile memory 120 into a plurality of zones or partitions set by the host 200 and manages them. Meta data for the unit address region may be managed together.

For example, when a program is executed in a first zone of the non-volatile memory 120, the meta data regarding the first zone may be loaded into the memory 20 from the non-volatile memory 120. Subsequently, when a program is executed in the second zone, the meta data regarding the first zone may be written into the non-volatile memory 120 and updated, and meta data regarding the second zone may be loaded into the non-volatile memory 120.

When the address of the first task is in the same address region as that of the address of the previous task, at operation S530 the first task may be determined as being in a ready state. As the first task is determined so that execution preparation thereof is completed, the first task may be executed subsequent to the previous task.

However, when at operation S520 it is determined that the address of the first task is not in the same address region as that of the previous task, then at operation S540 execution of the first task may be delayed. For example, when there is another task in a not ready state in the task queue 21, execution of the different task may be determined. In an embodiment, when there is no other task in the not ready state in the task queue 21, the queue manager 72 may determine the first task as being in a ready state.

According to the embodiment of the inventive concept, tasks that have access to the same address regions may be consecutively executed. Thus, there may be a reduction in the time to load the meta data into the non-volatile memory 120 and to update in the non-volatile memory 120.

Figure 17:
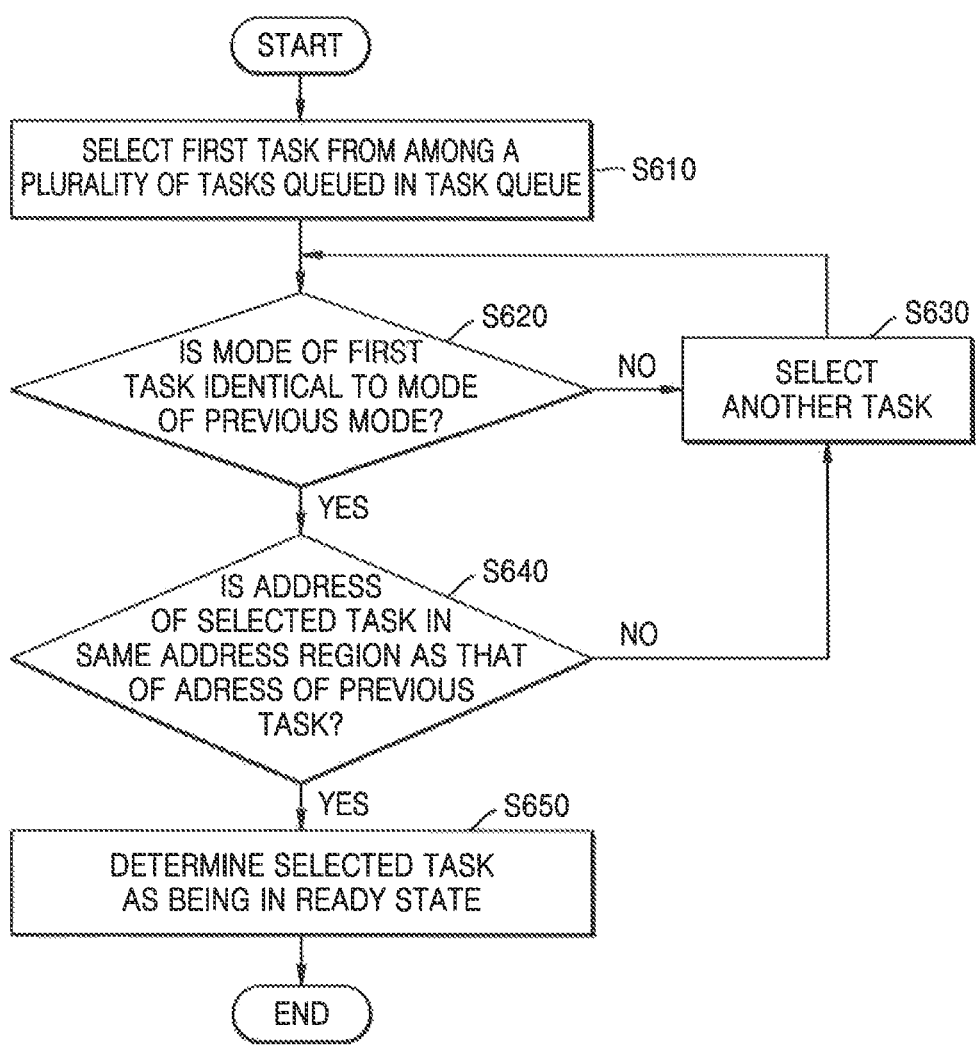
FIG. 17 is a flowchart providing an algorithm for operations to be performed between a host and a storage device according to an embodiment of the inventive concept.

FIG. 17 is a flowchart providing an algorithm of operations to be performed between a host and a storage device according to an embodiment of the inventive concept. The operations according to the current embodiment is a method of determining an execution order of tasks in the storage device that may include operations to be performed by the storage device 100a of FIG. 4 in a time series.

Referring to FIG. 17, at operation S610, a first task may be selected from among a plurality of tasks queued in the task queue 21, and at operation S620 it may be determined whether a mode of the selected, first task is identical to a mode of the previous task. The queue manager 72 may determine whether the mode of the selected, first task is identical to the mode of the previous task based on task information stored in the task queue 21, e.g., mode information.

As a result of the determination, if at operation S630 the mode of the selected, first task is not identical to the mode of the previous task, another task is selected, and then operation S620 is performed for another selected task.

When the mode of the selected task is identical to the mode of the previous task, at operation S640 it may be determined whether the address of the selected task is in the same address region as that of the address of the previous task. The queue manager 72 may determine whether the mode of the selected task is identical to the mode of the previous task based on task information stored in the task queue 21, e.g., an address.

When the address of the selected task is not in the same address region as that of the address of the previous task, at operation S630 another task is selected, and operation S620 is performed for another selected task. When the address of the selected task is in the same address region as that of the address of the previous task, then at operation S650 the selected task may be determined as being in a ready state.

Figure 18:
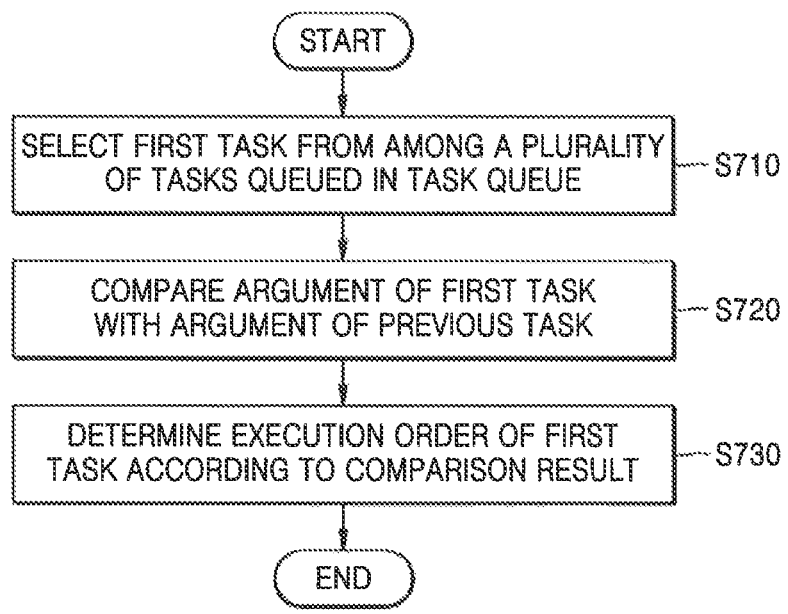
FIG. 18 is a flowchart providing an algorithm for a method of operating a storage device according to an embodiment of the inventive concept.

FIG. 18 is a flowchart providing an algorithm for a method of operating a storage device according to an embodiment of the inventive concept. The method of operating the storage device according to the current embodiment that is a method of determining an execution order of tasks in the storage device may be performed by the storage device (see 100 of FIGS. 1 and 2, or 100a of FIG. 4) according to embodiments of the inventive concept, for example. Thus, descriptions with reference to FIGS. 1 through 17 may be applied to the current embodiment. Hereinafter, the current embodiment will be described together with reference to FIG. 1.

Referring to FIG. 18, at operation S710 a first task is selected from among a plurality of task queued in the task queue 21. For example, the scheduler 11 may select the first task from among the plurality of tasks queued in the task queue 21. In an embodiment, the first task may be a write task. The scheduler 11 may select a first task from among write tasks queued in the task queue 21 according to their queued orders. The scheduler 11 may select the first queued task from among the write tasks as the first task. In an embodiment, the first task may be a read task, and the scheduler 11 may select a read task in which a mapping table corresponding to an address to be accessed by the read task is loaded into the memory 20 as the first task, from among read tasks queued in the task queue 21.

At operation S720, an argument of the first task is compared with an argument of the previous task. In this case, the previous task is the last-executed task. For example, the scheduler 11 may compare a mode included in the argument of the first task with a mode included in the argument of the previous task, thereby determining sameness. In another example, the scheduler 11 may compare an address included in the argument of the first task with an address included in the argument of the previous task, thereby determining whether the address of the first task and the address of the second task are in the same address region.

Subsequently, at operation S730, an execution order of the first task may be determined according to a comparison result. For example, when, as a result of the comparison, it is determined that the mode of the first task is not identical to the mode of the previous task, the scheduler 11 may delay the execution order of the first task and may select another task from among tasks queued in the task queue 21. When it is determined that the mode of the first task is identical to the mode of the previous task, the scheduler 11 may determine the first task as being in a ready state and transmit an execution request for the first task to the host 200.

In another example, when, as a result of comparison, it is not determined that the address of the first task and the address of the previous task are in the same address region, the scheduler 11 may delay an execution order of the first task and may select another task queued in the task queue 21. When it is determined that the address of the first task and the address of the previous task are in the same address region, the scheduler 11 may determine the first task as being in a ready state and transmit the execution request for the first task to the host 200.

Accordingly, in the storage device 100 according to an embodiment of the inventive concept, based on a command argument of commands CMD corresponding to the plurality of tasks, the scheduler 11 may determine an execution order of a plurality of tasks so that the performance of the storage device 100 may be increased. The scheduler 11 may determine the execution order of the plurality of tasks so that tasks in the same modes may be consecutively executed or the tasks that have access to the same address region may be consecutively executed.

Figure 19:
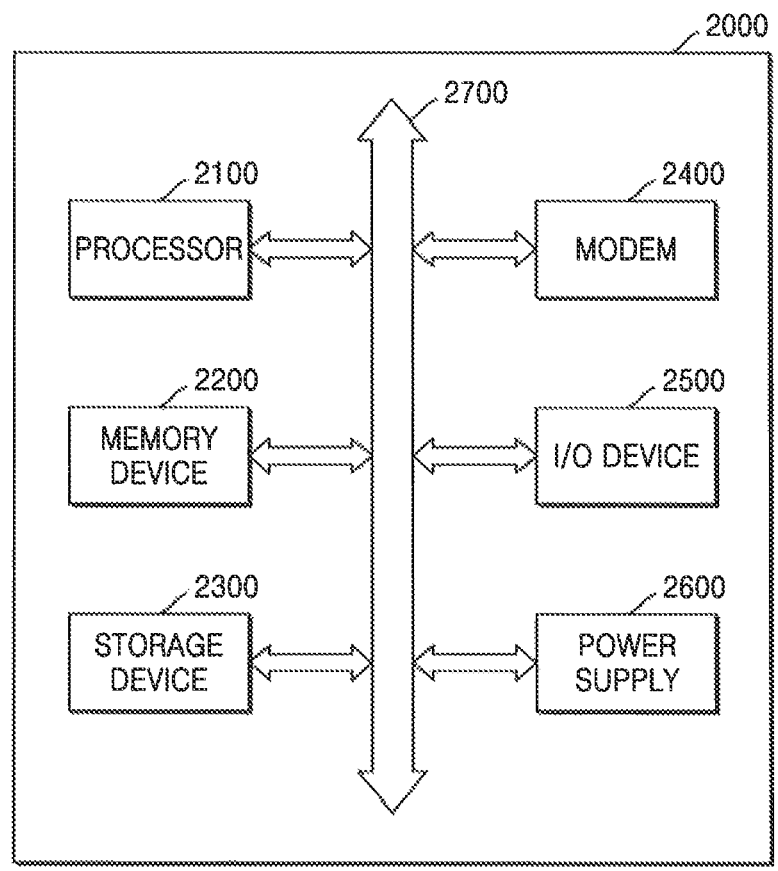
FIG. 19 is a block diagram of an electronic apparatus according to an embodiment of the inventive concept.

FIG. 19 is a block diagram of an electronic apparatus according to an embodiment of the inventive concept.

Referring to FIG. 19, an electronic apparatus 2000 may include, for example, a processor 2100, a memory device 2200, a storage device 2300, a modem 2400, an I/O device 2500, and a power supply 2600. In the current embodiment, the storage device 2300 may support a cache function and a command queue function and may determine an execution order of tasks based on a command argument of the tasks. Based on the command argument of the tasks, the storage device 2300 may determine an execution order of the tasks so that the tasks in the same mode may be consecutively executed, or may determine the execution order of the tasks so that the tasks that have access to an address in the same address region may be consecutively executed. Descriptions with reference to FIGS. 1 through 18 may be applied to the storage device 2300.

In the conventional technology, storage devices have write tasks queued in a command queue sequentially in ready states and are executed. Some of the problems of the conventional include that interleaving is not possible, and the performance of a storage device, for example, an embedded multi-media card (eMMC) is lowered.

In contrast, embodiments of the inventive concept improve upon the operation of conventional storage technology, and thus the functionality of other applications by increasing the performance of the operation of the storage device. As a result embodiments of the inventive concept provide benefits and advantages over the conventional technology by having improved functionality and capabilities of storage devices. In turn, other technologies will benefit from the improvement in the operation of the storage devices according to embodiments of the inventive concept.

For example, embodiments of the present invention improve a write operation to be more efficient than the conventional technology by, for example, when in a command queue mode, there are various types of write streams (e.g. write tasks having different modes), and a scheduler is configured to set different execution orders according to the different modes to provide a more efficient performance of a write operation. For example, while interleaving cannot be performed, (such as discussed regarding FIGS. 14A and 14B), in embodiments of the inventive concept, the storage device may program data stored in a data buffer into different memory devices in an interleaving manner that may be connected to different channels, or different ways, such as by multi-level programming. Accordingly, the storage device may firstly perform tasks in performance write modes through task scheduling and may delay the execution of tasks in reliable write mode to program the data in an interleaving manner. Thus, the performance of the storage device may be improved over conventional technology.

In addition, an execution order of tasks may be set in which tasks that have access to the same address region may be consecutively executed, which is an improvement over the conventional technology in which a sequence of tasks in a queue are performed without regard to the address region. Furthermore, tasks that have the same mode and the same address region may be consecutively executed to improve the performance of the storage device over the conventional technology, and solve problems of the conventional technology, such as degraded performance of storage devices including but in no way limited to eMMC cards.

Also, according to embodiments of the inventive concept, when a write task to be executed is selected from among queued write tasks, a write task in the same mode as that of a previously-executed write task may be firstly in a ready state for execution. Thus, when data in a program unit are stored in a data buffer, and the data buffer is full or almost full, a write task in a different mode may be in a ready state for execution.

While the inventive concept has been particularly shown and described with reference to embodiments thereof, it will be understood that various changes in form and details may be made therein without departing from the spirit and scope of the following claims.

What is claimed is:

1. A method of operating a storage device including scheduling a task to operate a non-volatile memory, the method comprising:
   receiving from a processor commands to operate the storage device, each command corresponding to a task and having one of a plurality of modes of operation;
   queuing a plurality of tasks in a task queue,
   wherein the queuing of the plurality of the tasks in the task queue comprises:
      extracting using a scheduler a mode of operation of a task to be executed from a command; and
      storing the extracted mode of operation in the task queue as mode information;
   determining by the scheduler whether a mode of a next task in the task queue is identical to a mode of a previously-executed task by comparing the stored mode information;
   determining an execution order of the next task according to a result of the determination whether the mode of the next task is identical to the mode of a previously-executed task;
   delaying execution of the next task if the mode of the next task is determined to be different from the mode of the previously-executed task;
   determining by the scheduler whether a mode of a second next task in the task queue is identical to the mode of the previously-executed task; and
   executing the second next task before the next task if the mode of the second next task is identical to the mode of the previously-executed task,
   wherein the plurality of modes of operation includes a first write mode and a second write mode,
   in the first write mode, write data is not required to be immediately programmed into the non-volatile memory, and
   in the second write mode, write data is required to be immediately programmed into the non-volatile memory.

2. The method of claim 1, wherein the plurality of modes of operation includes a plurality of memory write operations.

3. The method of claim 1, wherein the determining of the execution order of the next task comprises:
   when the mode of the next task is not identical to the mode of the previously-executed task, checking whether data in a program unit are stored in a data buffer;
   when the data in the program unit are not stored in the data buffer, selecting a second next task from among the plurality of tasks; and
   when the mode of the previously-executed task is identical to the mode of the next task or when the data in the program unit are stored in the data buffer, determining the next task as being in a ready state.

4. The method of claim 1, wherein the determining of the execution order of the next task comprises:
   when the mode of the previously-executed task is identical to the mode of the next task, checking whether an address region in which a next address to be accessed by the next task is located is the same address region as that of a second address to be accessed by the previously-executed task;
   when the next address is in the same address region as that of the second address, determining the next task as being in a ready state; and
   when the mode of the previously-executed task is not identical to the mode of the next task, delaying an execution order of the next task.

5. The method of claim 1, wherein the determining of the execution order of the next task comprises:
   when the mode of the previously-executed task is identical to the mode of the next task, checking whether an address region in which a next address to be accessed by the next task is located, is in the same address region as that of a second address to be accessed by the previously-executed task;
   when the next address is the same address region as that of the second address, determining the next task as being in a ready state; and
   when the next address is not in the same address region as that of the second address, delaying an execution order of the next task.

6. The method of claim 5, wherein the non-volatile memory is divided into a plurality of logic address regions, and the address region is one from among the plurality of logic address regions.

7. The method of claim 1, wherein the plurality of modes of operation is set according to mode information included in a command argument of commands corresponding to the tasks.

8. The method of claim 7, wherein the mode information comprises at least one from among a reliable write, a forced write, a regular write, and a data tag mode.

9. The method of claim 1, wherein the storage device operates in a cache-on mode in which a cache function is enabled.

10. The method of claim 1, wherein the storage device comprises an embedded multi-media card (eMMC).

11. A method of operating a storage device including non-volatile memory, the method comprising:
   selecting a first task from among a plurality of tasks queued in a task queue of the storage device;
   comparing a first command argument including one of a plurality of write modes corresponding to the first task and stored as first task information with a second command argument including a write mode corresponding to a previously-executed task and stored as second task information; and determining an execution order of the first task according to a result of the comparing of the first command argument with the second command argument, including when the first stored task information is not identical to the second stored task information, delaying an execution order of the first task, wherein, each of the first task and the previously-executed task is associated with a write operation, and the first command argument and the second command argument indicate whether write data are required to be immediately programmed into the non-volatile memory.

12. The method of claim 11, wherein the determining of the execution order of the first task comprises:

when the write mode included in the first command argument is identical to the write mode included in the second command argument, determining the first task as being in a ready state.

13. The method of claim 11, wherein the determining of the execution order of the first task comprises:

when a write mode included in the first command argument is not identical to the write mode included in the second command argument, checking whether data in a program unit are stored in a data buffer;

when the data in the program unit are not stored in the data buffer, selecting a second task from among the plurality of tasks; and when the write mode included in the first command argument is identical to the write mode included in the second command argument, or when the data in the program unit are stored in the data buffer, determining the first task as being in a ready state.

14. The method of claim 11, wherein the determining of the execution order of the first task comprises:

when a first address included in the first command argument and a second address included in the second command argument are not included in a same address region, delaying an execution order of the first task; and when the first address included in the first command argument and a second address included in the second command argument are included in the same address region, determining the first task as being in a ready state.

15. The method of claim 11, wherein the determining of the execution order of the first task comprises, when the first command argument indicates a reliable write mode and the second command argument indicates a performance write mode, delaying execution of the first task, wherein, the reliable write mode requires that the write data are immediately programmed into the non-volatile memory and the performance write mode does not require that the write data are immediately programmed into the non-volatile memory.

16. A method of operating a storage device including a non-volatile memory, the method comprising:

queuing a plurality of tasks in a task queue, wherein the queuing of the plurality of tasks in the task queue comprises:

extracting a mode of operation of a task from a received command; and storing the extracted mode of operation as mode information in the task queue;

selecting, by a scheduler of a device controller, a first task from among the plurality of tasks queued in the task queue;

determining whether a mode of the selected first task is identical to a mode of a last executed task by comparing the stored mode information;

transmitting an execution order to a host when the mode of the first task is identical to the mode of the last executed task;

delaying the transmitting of the execution order to the host when the mode of the first task is not identical to the mode of the last executed task, and selecting a next task from among the plurality of tasks queued in the task queue; and transmitting an execution order for the selected next task to the host in response to determining a mode of the selected next task is identical to the mode of the last executed task, wherein, each of the first task and the last-executed task is associated with a write operation, and the mode indicates whether write data are required to be immediately programmed into the non-volatile memory.

17. The method according to claim 16, wherein the delaying transmitting of the execution order of the first task to the host occurs for a predetermined count of selected tasks.

18. The method according to claim 16, wherein the delaying transmitting of the execution order of the first task to the host occurs for a predetermined period of time.

19. The method according to claim 17, wherein the execution order of the first task is transmitted to the host after the predetermined count has been reached.

20. The method according to claim 18, wherein the execution order of the first task is transmitted to the host after the predetermined period of time has been reached.

* * * * *